United States Patent
Clikeman et al.

(10) Patent No.: US 7,598,317 B2
(45) Date of Patent: Oct. 6, 2009

(54) PRECISION FRAGMENTATION ASSEMBLAGES AND OLEFIN POLYMERIZATION CATALYSTS MADE THEREFROM

(75) Inventors: Richard Roy Clikeman, Doylestown, PA (US); Morris Christopher Wills, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 646 days.

(21) Appl. No.: 11/498,697

(22) Filed: Aug. 3, 2006

(65) Prior Publication Data

US 2006/0270813 A1 Nov. 30, 2006

Related U.S. Application Data

(62) Division of application No. 10/753,602, filed on Jan. 8, 2004, now Pat. No. 7,153,915.

(60) Provisional application No. 60/440,142, filed on Jan. 15, 2003.

(51) Int. Cl.
*C08L 37/00* (2006.01)
*C08F 2/22* (2006.01)

(52) U.S. Cl. .................. 524/811; 524/812; 524/817; 524/818; 524/808; 523/335

(58) Field of Classification Search .............. 524/811, 524/812, 817, 818, 808; 523/335
See application file for complete search history.

(56) References Cited

U.S. PATENT DOCUMENTS

| | | | |
|---|---|---|---|
| 3,956,218 A * | 5/1976 | Keppler et al. ............. 524/501 |
| 4,465,782 A | 8/1984 | McKenzie | |
| 4,533,707 A | 8/1985 | McKenzie | |
| 4,940,682 A | 7/1990 | Sasaki et al. | |
| 5,086,131 A | 2/1992 | Miwa et al. | |
| 5,409,875 A | 4/1995 | Hsu et al. | |
| 5,461,017 A | 10/1995 | Furtek et al. | |
| 5,506,281 A | 4/1996 | Mühlbauer | |
| 5,942,586 A | 8/1999 | Herrmann et al. | |
| 5,976,405 A | 11/1999 | Clikeman et al. | |
| 6,013,594 A | 1/2000 | Yang et al. | |
| 6,812,283 B2 | 11/2004 | Duijzings et al. | |
| 2002/0107344 A1 | 8/2002 | Peterson | |

FOREIGN PATENT DOCUMENTS

| | | |
|---|---|---|
| EP | 0 767 184 B1 | 8/1999 |
| EP | 1 312 618 A2 | 5/2003 |
| GB | 2 036 761 A | 7/1980 |
| JP | 62034911 A | 2/1987 |
| JP | 62053368 A | 3/1987 |
| JP | 02153912 A | 5/2002 |
| JP | 2002256006 A | 9/2002 |
| JP | 2004010665 A | 1/2004 |
| WO | WO 97/48742 A1 | 12/1997 |
| WO | WO 02/10222 A1 | 2/2002 |

* cited by examiner

*Primary Examiner*—David Wu
*Assistant Examiner*—Rip A. Lee
(74) *Attorney, Agent, or Firm*—Richard R. Clikeman; Thomas S. Deibert

(57) ABSTRACT

A precision fragmentation assemblage is disclosed, along with precision fragmentation assemblage catalysts derivable therefrom. A method for the preparation of a precision fragmentation assemblage is also disclosed, along with a method for preparing precision fragmentation assemblage catalysts from precision fragmentation assemblages. A method is further disclosed for using precision fragmentation catalysts in the polymerization of olefins to produce polyolefins.

19 Claims, No Drawings

PRECISION FRAGMENTATION ASSEMBLAGES AND OLEFIN POLYMERIZATION CATALYSTS MADE THEREFROM

This patent application is a divisional of U.S. patent application Ser. No. 10/753,602, filed Jan. 8, 2004, now U.S. Pat. No. 7,153,915, and derives priority from U.S. patent application Ser. No. 60/440,142, filed Jan. 15, 2003.

The present invention relates to a precision fragmentation assemblage (PFA) and olefin polymerization PFA catalyst made therefrom. The present invention further relates to a method for preparing the PFA, for preparing the PFA catalyst, and to a method of using the PFA catalyst to prepare polyolefins.

In the early 1950s, Ziegler discovered that alpha-olefins could be polymerized at low pressure in the presence of metal catalysts. The first homogeneous polymerization catalyst Cp2TiCl2-AlEt2Cl was reported within a few years. Following this initial discovery and development of what came to be known as Ziegler-Natta catalysts, an intense effort ensued aimed first at improving catalyst stability and activity, and later at expanding the types of α-olefin that could be prepared. It was found that partially hydrolyzed aluminum alkyls, in particular methylalumoxane (MAO), could greatly increase the activity of the of transition metal catalysts, especially of zirconocene complexes. In addition, other activators such as fluoroaryl borates augmentated catalyst performance.

Although many of the catalysts for olefin polymerization, including single-site metallocenes, are capable of performing as homogeneous catalysts for solution polymerization in non-nucleophilic organic solvents such as toluene or aliphatic hydrocarbons, the range of polyolefins that can be achieved in homogeneous systems is limited. Commercial polymerization processes using soluble catalysts are mostly those in which the lower-crystallinity polymers (e.g., elastomers and very low-density ethylene copolymers) produced are soluble in the reaction medium. Production of higher density or higher crystallinity polyolefins via slurry, bulk-monomer, or gas-phase processes results in insoluble product. In batch polymerization, the polyolefin particles tend to be non-uniform in size. In economically desirable continuous processes, this non-uniformity manifests itself in reactor fouling. As a result, catalyst systems based on insoluble carriers that can be fed into the reactor smoothly without clumping were sought.

Insoluble carriers that have been developed include inorganics magnesium chloride and silica. Organic polymeric particles have also been used as supports. Although metal catalysts and activators supported by such systems may be capable of catalyzing olefin polymerization, producing polyolefins efficiently, these supported catalysts are prone to gross, uneven fragmentation during reaction. Instead of a single polyolefin particle being formed from a single supported catalyst particle, multiple particles form. Instead of fragmenting smoothly to form very small, uniformly sized pieces of supported catalyst, uniformly distributed throughout the growing polyolefin particle, some smaller pieces of the original supported catalyst particles completely detach to form fines which foul the polymerization reactor, causing frequent down time with attendant lost revenue. Further negative features are that the fines, which are out-of-specification on the small side represent lost yield, and that the overall bulk particle size distribution of the polyolefin product broadens, often beyond the limits of acceptability. In addition, those smaller pieces of the original supported catalyst that do not detach from the original catalyst particle are often of widely differing size, introducing inhomogeneities within the growing polyolefin particle and reducing polyolefin yield.

U.S. Pat. No. 6,013,594 to Yang, et al., discloses polymeric support particles formed by spray drying microparticles which are suspended in a liquid medium, such as water or a hydrocarbon diluent. Although the size of Yang's microparticles does tend to determine pore size in the spray dried particles thus formed, spray dried particles formed in this way have a broad bulk particle size distribution. Furthermore, fines typically form during spray drying, some of which cling to the larger bulk particles only to detach from those larger particles prior to and during olefin polymerization, thus forming undesirably small polyolefin bulk particles and causing reactor fouling. In addition, while it is desirable to prepare hard, highly crosslinked microparticles to minimize the extent to which they imbibe solvents and swell so that interstitial space, and therefore porosity, is maintained during catalyst loading and olefin polymerization, it is those very highly crosslinked particles that cause the greatest amount of dust formation in spray dryers. Such dust formation is well known to decrease yield of desired bulk particles, to increase the risk of explosion, and to clog bag houses such that costly spray dryer shutdowns become frequent.

We have, surprisingly, discovered that the problems enumerated supra may be overcome by assembling fragmentation domains, by aqueous coagulation or other agglomeration means, to produce bulk particles. Monomers are added to these bulk particles before, during, or after coagulation. Subsequent polymerization produces precision fragmentation assemblages (PFAs) which can then be loaded with catalytic components and, optionally, activator components to produce precision fragmentation assemblage catalysts (PFA catalysts) suitable for catalyzing olefin polymerization. The presence of a connecting phase, of precisely controllable amount, composition, and morphology within the precision fragmentation assemblage, allows elimination of detached fines and control of stresses within the PFA catalyst during olefin polymerization, particularly during the critical early stages. Catastrophic fragmentation is avoided. One PFA catalyst particle produces only one appropriately larger polyolefin particle. Specialized particle formation processes, e.g., "spheroid" coagulation and "jetting" processes, form spherical PFA particles having a narrow bulk particle size distribution which can be converted to PFA catalysts, which, in turn, can be used to produce polyolefin bulk particles having narrow particle size distributions.

One aspect of the present invention relates to a precision fragmentation assemblage, wherein said assemblage comprises:

(A) a plurality of fragmentation domains; and
(B) one or more fragmentation zones;
wherein said fragmentation domain comprises at least one first polymer; and
wherein said fragmentation zone comprises:
(i) one or more connecting phases;
(ii) optionally, one or more pore phases; and
(ii) optionally plural polymeric nanoparticles; and
wherein said connecting phase comprises at least one second polymer; and
wherein said nanoparticles comprise at least one third polymer.

A second aspect of the present invention relates to a precision fragmentation assemblage catalyst, wherein said catalyst comprises:

(A) a precision fragmentation assemblage; and
(B) at least one catalytic component;

wherein said precision fragmentation assemblage comprises:
(i) a plurality of fragmentation domains; and
(ii) one or more fragmentation zones;
wherein said fragmentation domain comprises at least one first polymer; and
wherein said fragmentation zone comprises at least one connecting phase, said connecting phase comprising at least one second polymer.

A third aspect of the present invention relates to a precision fragmentation assemblage catalyst further comprising at least one activator component.

A fourth aspect of the present invention relates to an olefin polymerization process, wherein said olefin polymerization process comprises:
(A) contacting at least one olefin monomer with at least one precision fragmentation assemblage catalyst;
(B) polymerizing said olefin monomer to produce a polyolefin;
(C) isolating said polyolefin,
wherein said catalyst comprises:
(i) a precision fragmentation assemblage; and
(ii) at least one catalytic component;
wherein said precision fragmentation assemblage comprises:
(a) a plurality of fragmentation domains; and
(b) one or more fragmentation zones;
wherein said fragmentation domain comprises at least one first polymer; and
wherein said fragmentation zone comprises at least one connecting phase, said connecting phase comprising at least one second polymer.

A fifth aspect of the present invention relates to a method of making a precision fragmentation assemblage, comprising the steps of:
(A) polymerizing a first monomer in aqueous medium to form plural fragmentation domains dispersed in said aqueous medium, said fragmentation domains comprising a first polymer;
(B) combining a second monomer with said fragmentation domains in said aqueous medium;
(C) optionally, combining a porogen with said fragmentation domains in said aqueous medium;
(D) optionally, combining plural polymeric nanoparticles with said fragmentation domains in said aqueous medium;
(E) agglomerating said plural fragmentation domains to form one or more agglomerate particles comprising said fragmentation domains, said second monomer, optionally said porogen, and optionally said polymeric nanoparticles; and
(F) polymerizing said second monomer to form a second polymer,
wherein said second monomer comprises at least one multi-ethylenically unsaturated monomer in an amount of at least 0.05 percent by weight to 100 percent by weight, based on the weight of said second monomer;
wherein said precision fragmentation assemblage comprises:
(i) a plurality of fragmentation domains;
(ii) one or more fragmentation zones;
wherein said fragmentation domain comprises said first polymer; and
wherein said fragmentation zone comprises:
(a) a connecting phase;
(b) optionally, one or more pore phases; and
(c) optionally, plural polymeric nanoparticles;

wherein:
said connecting phase comprises said second polymer;
said second polymer comprises at least one multi-ethylenically unsaturated monomer, present as polymerized units, in an amount of at least 0.05 percent by weight to 100 percent by weight, based on the weight of said second polymer;
said polymeric nanoparticles comprise a third polymer comprising, as polymerized units, a third monomer; and
(iii) one or more tether groups covalently bound to a polymeric chain, wherein said polymeric chain is a chain selected from the group consisting of said first polymer, said second polymer, said third polymer, and combinations thereof; and
wherein at least one monomer selected from said first monomer, said second monomer, and said third monomer is a monomer having a tether group.

Used herein, the following terms have these definitions.

The term "(meth)acryl" refers to both "acryl" and "methacryl". For example, "methyl (meth)acrylate" refers to both "methyl acrylate" and "methyl methacrylate".

A "fragmentation domain" is a domain that includes one or more polymeric chains of a "first polymer" prepared from at least one "first monomer", and can be combined with other fragmentation domains to form a larger assemblage defined herein as a "precision fragmentation assemblage" ("PFA"). Each fragmentation domain is itself a particle, which is incorporated into a larger PFA particle. The chains of first polymer may, optionally, bear one or more "tether groups".

A "precision fragmentation assemblage" ("PFA") is an assemblage of at least one type of plural fragmentation domains. The interstitial region which exists among those fragmentation domains is a "fragmentation zone". A fragmentation zone includes at least one "connecting phase" and may, optionally, include one or more pore phases. The connecting phase connects the individual fragmentation domains so that they do not detach from the PFA during its preparation, during the preparation of the PFA catalyst, or from the growing polyolefin particle during olefin polymerization utilizing the PFA catalyst.

The "connecting phase" includes at least one "second polymer" which may or may not have the same composition as the "first polymer" of the fragmentation domain. The "second polymer" is prepared from one or more "second monomer".

An optional "pore phase" may be filled with one or more substances in solid, liquid, gaseous, or supercritical state. One function of the "pore phase" is to facilitate movement of substances from the outer surface of the PFA to interior surfaces of the PFA. The pore phase is typically prepared by polymerizing second monomer in the presence of a "porogen", in which it is soluble, to produce second polymer which is insoluble in the porogen. The process is referred to as "polymerization induced phase separation" ("PIPS").

A PFA can be loaded with a "catalytic component" such as transition metal atoms, ligands associated with those transition metal atoms, and, optionally, an "activator component" such as aluminum alkyls, aluminoxanes, and borates to produce a "precision fragmentation assemblage catalyst" ("PFA catalyst"). PFA catalysts can be used to catalyze polymerization of olefins. As such, each PFA catalyst particle acts as a template for a larger bulk particle of polyolefin that forms during polymerization. The term "PFA" refers to a "precision fragmentation assemblage" as it exists before loading with transition metal atoms, ligands associated with the transition metal atoms, and, optionally, activators. The term "PFA catalyst" refers to the PFA after such loading. The "PFA" structure serves as a template for well-controlled precision fragmentation during polymerization. A "PFA catalyst" can be used to provide well-controlled precision fragmentation during olefin polymerization. In this way, fragmentation domains of predetermined size and shape move away from one another to maximize olefin polymerization efficiency while avoiding actual physical detachment from the larger PFA catalyst particle, of which it is a part, as that PFA catalyst particle becomes an even larger polyolefin particle.

A "fragmentation zone" is, by design, a zone of relative weakness and/or flexibility in a precision fragmentation assemblage. The fragmentation zone includes the interstitial region among the fragmentation domains contained within the PFA. It is not a requirement of the present invention that the surfaces of adjacent fragmentation domains touch, but when they do touch the interface at the point of contact between the adjacent fragmentation domains may be considered to be part of the fragmentation zone. It is a requirement of the present invention that the fragmentation zone include at least one "connecting phase" and that each connecting phase include at least one "second polymer" which may, optionally, bear one or more "tether groups". The fragmentation zone may further, optionally, include one or more pore phases, one or more types of plural polymeric nanoparticles ("PNPs"), or combinations thereof. Appropriate selection of fragmentation zone size, composition, porosity, morphology, and degree of uniformity may be accomplished to afford precise control of PFA fragmentation rate and fragmentation pattern.

A "tether group" is a functional group covalently bound to a polymer chain, and capable of interacting with some portion of a catalytic component (e.g., a transition metal atom, or some moiety that is part of a transition metal complex), or some moiety that is part of an activator component (e.g., of an aluminum alkyl, an aluminoxane, or a boron based activator). A "tether group" may interact with these moieties by σ-bonding, π-bonding, ionic association, polar interaction, covalent bonding, or a combination thereof. A "tether group" may be covalently bound to chains of first polymer, of second polymer, of optional polymeric nanoparticle, or combinations thereof.

"Polymeric nanoparticles" ("PNPs") are any crosslinked polymeric particles having an average particle size, in microns, of 0.002 to 0.1, preferably 0.002 to 0.05, more preferably 0.002 to 0.02, and most preferably 0.005 to 0.01.

A "PNP-PFA" is a precision fragmentation assemblage that further includes plural polymeric nanoparticles. The fragmentation zone of a PNP-PFA includes PNPs. The PNPs may be covalently or otherwise bound to the PFA, or may be physically entrapped within the PFA. When covalently bound to the PFA, PNPs may be bound to the second polymer, to the fragmentation domain, to each other, or any combination of these.

"Fragmentation" is the process by which a "fragmentation domain" separates from adjacent fragmentation domains of a catalytic PFA. It is desirable that fragmentation of catalytic PFAs occur in a precisely controlled manner during olefin polymerization. In a preferred embodiment, the fragmentation domains move away from each other but do not detach from the PFA.

A "pendant" group is a group that is attached to the backbone of a polymer. The term pendant may be used to describe a group that is actually part of a polymerized monomer unit. For example, the hydroxyethyl group of a polymerized unit of 2-hydroxyethyl methacrylate may be referred to as a "pendant hydroxyethyl group", or more generally as "pendant hydroxy functionality". It is also common to refer to large groups attached to a polymer backbone as "pendant" when those large groups are compositionally distinct from the backbone polymer. A "pendant" group may further be described as "pendant to" the backbone.

A "terminal" group resides at the end of a polymer chain and is chemically attached to a terminal, polymerized, monomer unit. A terminal group may, for example, have a composition distinct from the composition of the backbone of the polymer. A "pendant" group may occur in a "terminal" position. As such, a "terminal" group is a special case of a "pendant" group.

A group may also be "internal" to a polymer backbone. For a functional group to be an "internal group", the actual functional portion must be part of the backbone of the polymer.

A tether group may reside in a pendant, terminal, or internal position of a chain of first polymer, second polymer, or polymeric nanoparticle. A tether group may be incorporated into a polymer chain as part of a monomer or, for example, by post-reaction of functional groups which are already attached to the polymer chain.

"Tg" is the "glass transition temperature" of a polymeric phase. The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20 Centigrade degrees per minute. The Tg of various homopolymers may be found, for example, in *Polymer Handbook*, edited by J. Brandrup and E. H. Immergut, Interscience Publishers. The Tg of a polymer is estimated by using the Fox equation (T. G. Fox, Bull. *Am. Physics Soc.*, Volume 1, Issue No. 3, page 123 (1956)).

"Effective Tg". When a substance having some degree of solubility in a polymer is imbibed by that polymer, the softening temperature of the polymer decreases. This plasticization of the polymer can be characterized by measuring the "effective Tg" of the polymer, which typically bears an inverse relationship to the amount of solvent or other substance contained in the polymer. The "effective Tg" of a polymer containing a known amount of a substance dissolved within is measured just as described above for "Tg". Alternatively, the "effective Tg" may be estimated by using the Fox equation (supra), assuming a value for Tg (e.g., the freezing point) of the solvent or other substance contained in the polymer.

Molecular Weight. Synthetic polymers are almost always a mixture of chains varying in molecular weight, i.e., there is a "molecular weight distribution", abbreviated "MWD". For a homopolymer, members of the distribution differ in the number of monomer units which they contain. This way of describing a distribution of polymer chains also extends to copolymers. Given that there is a distribution of molecular weights, the most complete characterization of the molecular weight of a given sample is the determination of the entire molecular weight distribution. This characterization is obtained by separating the members of the distribution and then quantitating the amount of each that is present. Once this distribution is in hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(w_i/M_i) = \Sigma(N_i M_i)/\Sigma N_i$$

where:
$M_i$=molar mass of $i^{th}$ component of distribution
$W_i$=weight of $i^{th}$ component of distribution
$N_i$=number of chains of $i^{th}$ component and the summations are over all the components in the distribution. $M_w$ and $M_n$ are typically computed from the MWD as measured by Gel Permeation Chromatography (see the Experimental Section).

"Particle size" is the diameter of a particle. The "average particle size" determined for a collection of particles (e.g., fragmentation domains) is the "weight average particle size", "$d_w$", as measured by Capillary Hydrodynamic Fractionation technique using a Matec CHDF 2000 particle size analyzer equipped with a HPLC type Ultra-violet detector.

The term "particle size distribution" and the acronym "PSD" are used interchangeably herein. "Polydispersity" is used in the art as a measure of the breadth of the PSD. Used herein, "polydispersity" is a description of the distribution of particle sizes for a plurality of particles. As such, "polydispersity" and "PSD polydispersity" are used interchangeably. PSD polydispersity is calculated from the weight average particle size, $d_w$, and the number average particle size, $d_n$, according to the formulae:

$$PSD\ Polydispersity = (d_w)/(d_n),$$

where $d_n = \Sigma n_i d_i / \Sigma n_i$ $d_w = \Sigma n_i d_i d_i / \Sigma n_i d_i$, and where $n_i$ is the number of particles having the particle size $d_i$.

Estimation of whether a polymer and another component (e.g., another polymer or low molecular weight substance) will be miscible may be made according to the well-known methods delineated in D. W. Van Krevelen, *Properties of Polymers*, 3$^{rd}$ Edition, Elsevier, pp. 189-225, 1990. For example, Van Krevelen defines the total solubility parameter ($\delta_t$) for a substance by:

$$\delta_t^2 = \delta_d^2 + \delta_p^2 + \delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents, polymers, and polymer segments, and can be estimated using the group contribution methods of Van Krevelen. For example, to estimate whether a polymer having a given composition will be miscible with a particular solvent, one calculates $\delta_t^2$ for the polymer and $\delta_t^2$ for the solvent. Typically, if the difference between the two, $\Delta\delta_t^2$, is greater than 25 (i.e., $\Delta\delta_t > 5$), then the polymer and the solvent will not be miscible. These calculations are particularly useful for determining if a particular solvent will act as a porogen during the polymerization of monomers which are soluble in that solvent. In such case, it is desirable for the polymer thus formed to precipitate from the solvent during or after polymerization.

If, instead, it is desired to determine whether two polymers, differing in composition, will be miscible, the same calculations may be carried out, but the predicted upper limit of $\Delta\delta_t^2$ for miscibility will decrease as the molecular weight of one or both of polymers under consideration increases. This decrease is thought to parallel the decrease in entropy of mixing which occurs as the molecular weight of the components being mixed increases. For example, two polymers, each having a degree of polymerization of 100, will likely be immiscible even if the value of $\Delta\delta_t^2$ for their mixture is 9, or even 4 (i.e., $\Delta\delta_t = 3$, or even 2). Still higher molecular weight polymers may be immiscible at even lower values of $\Delta\delta_t$. Other sources of miscibility information include Olabisi et al., *Polymer-Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, 2$^{nd}$ Ed., CRC Press, 1991.

The fragmentation domains useful in the present invention may be prepared by any appropriate method known to the art, including, but not limited to, emulsion polymerization, suspension polymerization, microemulsion polymerization, slurry polymerization, solution polymerization, polymerization induced phase separation, thermally induced phase separation, and solvent induced phase separation. Descriptions of these methods are disclosed in Blackley, D. C. *Emulsion Polymerisation*; Applied Science Publishers: London, 1975; Odian, G. *Principles of Polymerization*; John Wiley & Sons: New York, 1991; *Emulsion Polymerization of Acrylic Monomers*; Rohm and Haas, 1967. When the average particle size of the fragmentation domain is in the range 0.8 microns to 20 microns, the preferred method of polymerization is aqueous suspension polymerization. When the average particle size of the fragmentation domain is in the range 0.04 microns to less than 0.8 microns, the preferred polymerization is aqueous emulsion polymerization. If it is desired to prepare fragmentation domains in the size range 0.02 microns to less than 0.04 microns, it is preferred to use microemulsion techniques to prepare them. It is preferred to prepare fragmentation domains of size 0.002 microns to less than 0.02 microns by solution techniques and polymerization induced phase separation techniques useful for preparation of polymeric nanoparticles (PNPs). Typically, the average particle size of a fragmentation domain is 0.002 micron to 20 microns, preferably 0.002 micron to 10 microns, more preferably 0.1 micron to 5 microns, and most preferably 0.5 micron to 3 microns. These ranges, and all others used herein, are inclusive and combinable. The polydispersity of the PSD of plural particles of a given fragmentation domain is typically 1.000, i.e., monodisperse, to 5, preferably 1.000 to 1, more preferably 1.000 to 1.3, and most preferably 1.000 to 1.1. A particularly preferred embodiment is one in which the plural particles of a given fragmentation domain are monodisperse, that is, they exhibit a polydispersity of unity. Two or more sizes of fragmentation domain may be combined by mixing, or may be prepared in situ, using techniques well known in the art to form multimodal fragmentation domain particle size distribution. Fragmentation domains differing in composition and/or morphology may also be combined in these ways. For example, a fragmentation domain bearing one type of tether group could be combined with a fragmentation domain bearing another type of tether group.

The fragmentation domains useful in the present invention must include at least one first polymer, which may be a homopolymer or a copolymer formed from at least one first monomer, a non-exhaustive list of which is given herein. Although the first polymer may be any polymer or copolymer made by any means, addition polymers and condensation polymers are particularly useful and are preferred. Of those two types of polymers, addition polymers are particularly preferred. The first monomers from which the addition polymer is formed are free-radical polymerizable ethylenically-unsaturated monomers. Examples of mono-ethylenically unsaturated monomers include: $C_1$-$C_{30}$ linear or branched chain alkyl (meth)acrylates, bornyl (meth)acrylate, and isobornyl (meth)acrylate; styrene, substituted styrenes; butadiene; monomers containing $\alpha,\beta$-unsaturated carbonyl functional groups such as fumarate, maleate, cinnamate and crotonate; (meth)acrylonitrile; and combinations thereof. A non-limiting list of halogen containing first monomers includes 2-bromoethyl acrylate, 2-bromoethyl methacrylate, 4-bromostyrene, vinylidene chloride, vinyl chloride, pentafluorophenyl acrylate, pentafluorophenyl methacrylate, 2-(perfluoroalkyl)ethyl(meth)acrylates, 2-(perfluorododecyl)ethyl acrylate, 2-(perfluorododecyl)ethyl methacrylate, 2-(perfluorohexyl)ethyl acrylate, 2-(perfluorohexyl)ethyl methacrylate, and vinylidene fluoride. The first monomer of the present invention may, further, be a siloxane or silane monomer, with ethylenically unsaturated siloxane monomers being particularly preferred silicon containing monomers. Silicon containing monomers useful in the present invention include: divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly(phenyl vinyl siloxane), and mixtures thereof.

Formation of the first polymer of the present invention may alternatively be achieved by condensation polymerization. Typically, a condensation polymer is formed as the product of reaction between two distinct multifunctional first monomers, each having reactive groups reactive with reactive groups on the other. An example of such a reactive pair is paraphenylene diisocyanate and hexamethylene diamine. Crosslinking may be achieved by incorporating, for example, trifunctional monomers such as diethylene triamine. Other suitable monomers and methods for preparing condensation polymers therefrom can be found in U.S. Pat. No. 4,360,376 and U.S. Pat. No. 3,577,515.

The first polymer may, optionally, include one or more tether groups. A tether group may be any group capable of interaction with the catalytic component, the activator component, or both. Functional groups capable of such interaction as part of a tether group include, but are not limited to, epoxy, vinyl, allyl, primary amino, secondary amino, imino, amide, imide, aziridinyl, hydrazide, amidino, hydroxy, hydroperoxy, carboxyl, formyl, methoxycarbonyl, carbamoyl, sulfone ($SO_2$), sulfine (SO), sulfeno (S), thiol, thiocarboxyl, thioformyl, pyrrolyl, imidazolyl, piperidyl, indazolyl and carbazolyl.

Examples of mono-ethylenically unsaturated monomers suitable as first monomers and having these functional groups include, but are not limited to: alcohols including hydroxyethyl(meth)acrylate, hydroxypropyl(meth)acrylate; vinyl esters including vinyl acetate and acetoxystyrene; epoxides including glycidyl(meth)acrylate; amines including N-butylaminoethyl(meth)acrylate, N,N-di(methyl)aminoethyl (meth)acrylate; and (meth)acrylamide and substituted (meth) acrylamides.

Examples of multi-ethylenically unsaturated monomers include butadiene, 1,4-butanediol di(meth)acrylate, 1,1,1-trimethylolpropane tri(meth)acrylate, allyl (meth)acrylate, divinylbenzene, trivinylbenzene, divinyltoluene, divinylketone, diallyl phthalate, diallyl maleate, N,N'-methylene bisacrylamide, ethyleneglycol di(meth)acrylate and polyethyleneglycol di(meth)acrylate. Flourinated multi-ethylenically unsaturated monomer are also useful as first monomer. For example, fluorinated diacrylates having structure 1,3-[CH2:CHCO2CH2CHOHCH2OC(CF3)2]2C6H3Rf, where Rf=C1-C30 perfluoroalkyl as disclosed in U.S. Pat. No. 4,914,171. Polymers derived from multi-ethylenically unsaturated monomers, which also serve as crosslinking monomers, typically bear residual ethylenic unsaturation (e.g., vinyl groups and allyl groups) as the result of incomplete reaction. Although the functional groups useful in the present invention are usually contained in polymer chains as pendant tether groups, or portions of pendant tether groups, the functional groups may in some cases be part of the backbone of the polymer. For example, a carbon-carbon double bond present in the backbone of the first polymer, as the result of 1,4-addition of butadiene, would be such a functional group.

The level of multi-ethylenically unsaturated monomer, present as polymerized units, in the first polymer is typically 0.5 weight percent to 100 weight percent, preferably 2 weight % to 100 weight %, more preferably 10 to 80 weight %, and most preferably 20 to 60 weight %, based on the weight of first polymer. The level of mono-ethylenically unsaturated monomer, present as polymerized units, in the first polymer is typically 0 weight percent to 99.5 weight percent, preferably, 0 weight % to 98 weight %, more preferably 20 to 90 weight %, and most preferably 40 to 80 weight %, based on the weight of first polymer.

The fragmentation domain may include a single phase, or multiple phases. When multiple phases are present, at least one phase will contain a first polymer. Other phases may include, for example: other first polymer of a different composition; non-polymers in solid, liquid, gaseous, or supercritical state; and combinations thereof. A pore phase may be a vacuum, or may contain air, or other gases, or combinations thereof. The fragmentation domain may have any shape. For example, the fragmentation domain may be spherical, elliptical, or hemispherical. An especially preferred shape is spherical. Fragmentation domains which include more than one phase many have any morphology, including, for example: core/shell wherein the shell is continuous and unbroken; core/shell wherein the shell has a single hole; and core/shell wherein the shell has multiple holes or pores. Examples of how multiple phase fragmentation domains can be prepared are disclosed in U.S. Pat. Nos. 5,835,174, 5,976, 405, 6,037,058, 6,271,898, and 5,972,363, and in patent publications EP-0915147, US-2002-0110690, and EP-2002-256005.

One skilled in the art will recognize that, when aqueous emulsion polymerization and microemulsion polymerization are used to prepare the first polymer of the present invention, surfactants and initiators will be present in the reaction medium. Conventional surfactants may be used to stabilize the emulsion polymerization systems before, during, and after polymerization of monomers. For emulsion polymers, these conventional surfactants will usually be present at levels of 0.1 percent to 6 percent by weight based on the weight of total monomer, whereas microemulsion polymerizations my require level as high as 30 weight %. Useful surfactants include,: anionic surfactants, for example, sodium lauryl sulfate and sodium dodecyl benzene sulfonate; nonionic surfactants, for example, glycerol aliphatic esters and polyoxyethylene aliphatic esters; and amphoteric surfactants, for example, aminocarboxylic acids, imidazoline derivatives, and betaines.

Initiation of emulsion polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. Free radical initiators known in the art of aqueous emulsion polymerization and micro-emulsion polymerization include water-soluble free radical initiators, such as hydrogen peroxide, tert-butyl peroxide, benzoyl peroxide, t-butyl peroctoate; alkali metal (sodium, potassium or lithium) or ammonium persulfate; azo initiators such as azobisisobutyronitrile or 2,2'-azobis(2-amidinopropane) dihydrochloride; or mixtures thereof. Such initiators may also be combined with reducing agents to form a redox system. Useful reducing agents include sulfites such as alkali metal meta bisulfite, or hyposulfite, sodium thiosulfate, or isoascorbic acid, or sodium formaldehyde sulfoxylate. The free radical precursor and reducing agent together, referred to as a redox system herein, may be used at a level of from about 0.01% to 5%, based on the weight of monomers used. Examples of redox systems include: t-butyl hydroperoxide/sodium formaldehyde sulfoxylate/Fe(III); t-butyl hydroperoxide/isoascorbic acid/Fe (III); and ammonium persulfate/sodium bisulfite/sodium hydrosulfite/Fe(III). The polymerization temperature may be 10° C. to 110° C., depending upon such things as free radical initiator decomposition constant and reaction vessel pressure capabilities.

Although a chain transfer agent such as a mercaptan (for example: n-octyl mercaptan, n-dodecyl mercaptan, butyl or methyl mercaptopropionate, mercaptopropionic acid at 0.05 to 6% by weight, based on total weight of monomer) may be employed to limit the formation of any significant gel fraction or to control molecular weight in emulsion polymerization, it is generally preferred to maintain the gel fraction, the level of crosslinking, of the fragmentation domain at a high level, so chain transfer agents are commonly not employed, or are used at a low level, typically less than 1.0 percent by weight, based on total monomer weight.

When the first polymer of the fragmentation domain is formed by aqueous suspension polymerization, the initiators listed for emulsion polymerization supra may be used. Stabilization of fragmentation domains formed by suspension polymerization (i.e., those particles having a size of greater than approximately 0.8 microns to 20 microns or more) is conveniently accomplish using water soluble polymers including polyvinyl alcohol, poly-N-vinyl pyrrolidone, carboxymethylcellulose, gelatin, hydroxyethylcellulose, partially saponified polyvinyl acetate, polyacrylamide, polyethylene oxide, polyethyleneimine, polyvinylalkyl ethers, polyacrylic acid copolymers of polyacrylic acid, polyethylene glycol, sodium polystrenesulfonate.

In another preferred embodiment of the present invention, a "macromolecular organic compound" having a hydrophobic cavity is present in the polymerization medium used to form the fragmentation domain. Preferably, the macromolecular organic compound is used when it is necessary to transport ethylenically unsaturated monomers, or other molecules which are not monomers, having very low water solubility. Examples of monomers having very low water solutility include lauryl or stearyl (meth)acrylates. By "very low water solubility" it is meant a water solubility at 25° C. to 50° C. of no greater than 50 millimoles/liter. For example, the macromolecular organic compound may be added to the monomer composition, the macromonomer aqueous emulsion, or the polymerization reaction mixture used to form the aqueous copolymer composition. Suitable techniques for using a macromolecular organic compound having a hydrophobic cavity are disclosed in, for example, U.S. Pat. Nos. 5,521,266 and 6,037,058.

A "precision fragmentation assemblage" ("PFA") is an assemblage of "fragmentation domains", the interstitial space among which is the "fragmentation zone" which, in turn, includes at least one "connecting phase" and, optionally, one or more "pore phases". Typically, the ratio of the total volume of the fragmentation zone to the total volume of the fragmenation domains contained within a PFA is 0.10 to 10, preferably 0.20 to 2.0, more preferably 0.30 to 1.0, and most preferably 0.3 to 0.5.

The connecting phase connects the individual fragmentation domains so that they do not detach from the PFA during its preparation, the preparation of the PFA catalyst, or the olefin polymerization utilizing the PFA catalyst. The "connecting phase" includes at least one "second polymer" which may or may not have the same composition as the "first polymer" of the fragmentation domain. Any of the first monomers listed supra as useful for preparation of the "first polymer" are also useful as second monomers for preparation of the second polymer. Typically, the ratio of the total weight of second polymer to the total weight of first polymer is 0.005 to 10, preferably 0.01 to 1.0, more preferably 0.05 to 0.5, and most preferably 0.1 to 0.20. The level of multi-ethylenically unsaturated second monomer, present as polymerized units, in the second polymer is typically 0.1 weight percent to 100 weight percent, preferably 0.5 weight % to 50 weight %, more preferably 1.0 to 20 weight %, and most preferably 2.0 to 10 weight %, based on the weight of second polymer. The level of mono-ethylenically unsaturated monomer, present as polymerized units, in the second polymer is typically 0 weight percent to 99.9 weight percent, preferably, 50 weight % to 99.5 weight %, more preferably 80 to 99 weight %, and most preferably 90 to 98 weight %, based on the weight of second polymer. Chain transfer agents, such as those listed supra may be used to regulate the length of the chains of second polymer, thereby precisely controlling the strength and flexibility of the connecting phase when used in concert with other parameters such as, for example, composition.

The optional "pore phase" may be filled with one or more substances in solid, liquid, gaseous, or supercritical state. Though not wishing to be bound be any particular theory, it is thought that, when a pore phase is present, that pore phase facilitates movement of substances such as solvent, catalytic components, activator components, and olefin monomers from the outer surface of the PFA to interior surfaces of the PFA. Although morphologies useful in the PFA of the present invention exist in which the individual pores of the pore phase do not interconnect, or in which there is no pore phase, it is preferred that there be a pore phase and that at least a portion of those individual pores do interconnect such that paths exist for transfer of solvents, catalytic components, activator components, and other substances between the exterior of the PFA and its interior. More preferably, most or all of the pores interconnect. Most preferably, the pore phase and connecting phase are co-continuous (i.e., bicontinuous, or even multicontinuous if there is more than one type of connecting phase and/or more than type of one pore phase). Typically, the pore volume of the PFA per dry weight of the PFA, expressed in cc/g, is 0.1 to 9.0, preferably 0.30 to 4.0, more preferably 0.5 to 3.0, and most preferably 1.0 to 2.5. The average pore size, in microns, is typically 0.005 to 10, preferably 0.01 to 2.0, more preferably 0.02 to 1.0, and most preferably 0.02 to 0.50. The percent of total pore volume deriving from pores of size less than 0.050 microns for all pores having a pore size of 0.005 to 10 microns is typically 20 to 95, preferably 30 to 80, more preferably 40 to 70, and most preferably greater than 50 to 60. The ratio of the volume of the pore phase to the volume of the connecting phase is typically 0.10 to 100, preferably 0.50 to 10, more preferably 1.0 to 5.0, and most preferably 2.0 to 5.0.

When a pore phase is not present in the fragmentation zone of the PFA of the present invention, it is preferred that the degree of crosslinking of the second polymer be such that the second polymer will swell sufficiently with solutions bearing the catalytic component and the activator component during catalyst loading that those components can penetrate to the interior of the PFA. The same is true for penetration of olefin monomer during olefin polymerization catalyzed by the PFA catalyst. Therefore, when no pore phase is present in the fragmentation zone, it is preferred that the level of multi-ethylenically unsaturated monomer, present as polymerized units, in the second polymer is 0.05 weight percent to 10 weight percent, more preferably 0.1 weight % to 5 weight %, and most preferably 0.2 to 1 weight %, based on the weight of second polymer. Further, when no pore phase is present in the fragmentation zone, it is preferred that the level of mono-ethylenically unsaturated monomer, present as polymerized units, in the second polymer is 90 weight percent to 99.95 weight percent, more preferably 95 to 99.9 weight %, and most preferably 99 to 99.8 weight %, based on the weight of second polymer. It is well known in the art that many monomers (e.g., butyl acrylate) undergo self crosslinking. When such monomers are present, it may be possible to reduce the level of multi-ethylenically unsaturated monomer, and in some cases eliminate there use altogether to achieve a desired level of crosslinking.

The fragmentation zone of the PFA of the present invention may, optionally, contain "polymeric nanoparticles", PNPs. Such PNP bearing PFAs, may alternatively be referred to as "PNP-PFAs". The PNPs useful in the present invention may be prepared using as third monomer any of the monomers and types of monomer disclosed herein as being first monomers suitable for preparation of the first polymer. Although the composition of a PNP may be identical to that of the first polymer, the second polymer, or both, its composition may vary widely from either or both. The level of multi-ethylenically unsaturated monomer, present as polymerized units, in the PNP is typically 2 weight percent to 100 weight percent, preferably 5 weight % to 100 weight %, more preferably 10 to 80 weight %, and most preferably 20 to 60 weight %, based on the weight of PNP. The level of mono-ethylenically unsaturated monomer, present as polymerized units, in the PNP is typically 0 weight percent to 98 weight percent, preferably, 0 weight % to 95 weight %, more preferably 20 to 90 weight %, and most preferably 40 to 80 weight %, based on the weight of PNP. The PNPs are crosslinked polymers having an average particle size, in microns, of typically 0.002 to 0.1, preferably 0.002 to 0.05, more preferably 0.002 to 0.02, and most preferably 0.005 to 0.01. The polydispersity of the PSD of the PNPs is typically 1.00 to 5.0, preferably 1.00 to 3.0, more preferably 1.00 to 1.5, and most preferably 1.00 to 1.3. It is desirable that, when plural PNPs are present in a PFA, the plural PNPs remain distributed within the PFA, without detaching from the PFA, throughout loading with catalytic component and optional activator component, and throughout subsequent olefin polymerization. This attachment may be accomplished by any means, including covalent bonding, ionic association, and polar interaction, or combinations thereof, of the PNP to second polymer, to fragmentation domain, to other PNPs, or combinations thereof. Physical entrapment of the PNPs within the PFA may also be utilized.

Although PNPs useful in the present invention may be devoid of functionality suitable for causing attachment of the PNP to PFA structures (e.g., fragmentation domains, connecting phases, and other PNPs) during formation of the PFA, it is preferred that the PNPs useful in the present invention bear at least one such "attachment group" capable of providing such attachment. Preferred attachment groups include functional groups useful in providing attachment of monomer units to growing polymer chains during free radical and condensation polymerization. The attachment groups useful for participation in free radical polymerization may, for example, be vinyl groups and allyl groups. The attachment groups useful for participation in condensation polymerization are moieties such as amine and isocyanate enumerated supra. More preferably, the attachment groups are free radical polymerizable ethylenically unsaturated groups. When PNPs bearing two or more such attachment groups are present during polymerization of the monomers to form the second polymer, it may not be necessary that multi-ethylenically unsaturated monomer, or other multi-functional monomer, be present, or that less may be required. In that case the PNP itself may provide the necessary degree of crosslinking for the second polymer. However, it is generally preferred, even in this case, that the ranges of level multi-ethylenically unsaturated monomer, or other appropriate multi-functional monomer, used to prepare the second polymer be the same as those stated supra.

The PNPs of the present invention typically have an "apparent weight average molecular weight" in the range of 5,000 to 1,000,000, preferably in the range of 10,000 to 500,000 and more preferably in the range of 15,000 to 100,000. As used herein, "apparent weight average molecular weight" reflects the size of the PNP particles using standard gel permeation chromatography methods, e.g., using THF solvent at 40° C., 3 Plgel™ Columns (Polymer Labs, Amherst, Mass.), 100 Angstrom (10 nm), $10^3$ Angstroms (100 nm), $10^4$ Angstroms (1 micron), 30 cm long, 7.8 mm ID, 1 milliliter per minute, 100 microliter injection volume, calibrated to narrow polystyrene standards using Polymer Labs CALIBRE™ software.

Polymeric nanoparticles useful in the present invention can be prepared by any means known in the art to provide PNPs having the characteristics described supra. Methods for preparing PNPs are disclosed in these publications: EP-2002-1245587, EP-2002-1245644, US-2002-0193521, and US-2002-0177522.

It is preferred that the PFA useful in the present invention is prepared by agglomerating fragmentation domains. Either concurrent with, or subsequent to the step of agglomerating the fragmentation domains, the following additional components are added to the agglomerated particles: at least one second monomer to be polymerized to form the second polymer; optionally, one or more porogens; optionally, a plurality of PNPs; and initiator. Alternatively, the second polymer can be a condensation polymer. In such case, and initiator is not required. The agglomeration may be achieved by any means know to the art. Preferred methods of agglomeration include spray drying, coagulation, jetting, and combinations thereof. More preferably, the agglomeration method is a method selected from the group consisting of coagulation, jetting, and combinations thereof. The most preferred agglomeration method is coagulation. Once formed, the agglomerate particles, including monomer, initiator, and optional components are subjected to conditions suitable to cause polymerization of the monomers to form second polymer. If a porogen is present during the polymerization, that porogen should be chosen (see the methods of van Krevelen supra) so that the second monomers are soluble in the porogen, yet the second polymer will separate from the porogen during or after polymerization to occupy a pore phase. A preferred method of agglomeration is coagulation. In a preferred embodiment, an aqueous emulsion containing a plurality of fragmentation domains is combined with a aqueous emulsified monomer mixture from which the second polymer will be made. The droplet size of the monomer droplets, which optionally contain porogen, is typically less than 10 microns, and preferably 1 micron or less. The monomer droplets and the fragmentation domains are then destabilized by, for example, adding multivalent cations to the combined aqueous system. Examples of substances useful in causing destabilization and coagulation of fragmentation domains and emulsion droplets include, but are not limited to: sodium chloride, potassium chloride, sodium sulphate, ammonium chloride, calcium chloride, magnesium chloride, magnesium sulphate, barium chloride, ferrous chloride, aluminum sulphate, potassium alum, iron alum, hydrochloric acid, sulphuric acid, phosphoric acid and acetic acid. Particularly useful cations are $Mg^{2+}$ and $Ca^{2+}$. Because spherical particles having narrow particle size distributions may be desirable in the PFA, the PFA catalyst, and the polyolefin product, the well-known methods of particle classification can be used to narrow the PSD of the PFA particles. Classification can, for example, be achieved by screening plural PFA particles, keeping desired particle size fractions. A more preferred method of achieving narrow PSD and more spherical agglomerated particles is to carry out a "spheroid coagulation" as disclosed in U.S. Pat. Nos. 4,401,806, 4,897,462, 5,514,772, and 4,277,426. Another preferred method of achieving narrow PSD is through "jetting" as disclosed in U.S. Pat. No. 3,922,255. If desired, the PSD of PFA particles prepared by spheroid coagulation may be even further narrowed through additional classification. When spray drying is utilized in the formation of PFAs, an aqueous system including plural fragmentation domains, monomer, and optional porogen may be spray dried, with polymerization occurring during or after isolation, or the fragmentation domains may first be isolated as agglomerates by spray drying and then infused with monomer and optional porogen, and polymerized.

In a further embodiment of the present invention, it is desirable that the precision fragmentation assemblage have a structure wherein there is a core of fragmentation domains surrounded by one or more layers of fragmentation domains of a different type. These differences in type of fragmentation domain include, but are not limited to: composition, including functional group type and amount: particle size and PSD; particle morphology; and degree of crosslinking. Further, a specific fragmentation domain type may be utilized in more than one layer (including the core) in PFAs having two or more such regions, and the concentration of that fragmentation domain may vary from layer to layer, or may be invariant. In these "layered PFAs", the fragmentation zone for one layer may be identical to, or different from, other layers. Preparation of the fragmentation zone or zones may be accomplished, for example, by a single polymerization of second monomer, and optional porogen, after all fragmentation domain layers have been formed, or after one or more layers of fragmentation domains have been formed. For example, a different type of fragmentation zone could be formed before, after or during formation of each layer of fragmentation domains, or before, during or after formation of only one or more of those layers, or any combination of thereof. Further, more than one type of fragmentation domain may be present in the same layer, and layers may interpenetrate one another. A preferred method of producing layered PFAs is staged coagulation. For example, a first stage is formed by coagulation of one or more types of fragmentation domain, and subsequent layers are formed from subsequent coagulations of other fragmentation domains. Although, any type of assemblage may be formed having regions of different types or concentrations of fragmentation domain, including regions containing no fragmentation domains, a preferred embodiment is one in which the regions are present concentrically about a core region. One or more layers of a layered PFA may have fragmentation zones free of connecting phase, provided that at least one layer does include a connecting phase. It is particularly preferred that the outermost layer include a connecting phase.

Selection of, for example: amounts of second polymer, pore phase, and PNP relative to the amount of fragmentation domain; the Tg of the second polymer; and the degree of crosslinking of the second polymer will influence the ease and uniformity of loading the resulting PFA with catalytic component, activator component, and any associated solvent, and the ease of penetration of the olefin monomer into the PFA catalyst. Moreover, these factors can be precisely manipulated to control the extent to which fragmentation domains are able to move away from each other during olefin polymerization, and to control the localized strain within the PFA catalyst particle during olefin polymerization, particularly during the early stage (i.e., during consumption of the first 10 to 20 percent of the olefin monomer). Proper control of such localized strain reduces the stress within the PFA catalyst particle during olefin polymerization, minimizing, or eliminating detachment of portions of that particle to form separate, smaller particles. Elimination of such gross and uncontrolled detachment is to be avoided because it results in reactor fouling and shutdown, in reduction of the average particle size of the polyolefin product, and in a skewing and broadening of the polyolefin PSD. Other factors affording precise control of olefin polymerization are the amount, type, and location of tether groups. A tether group may be attached to a fragmentation domain, a second polymer, a PNP, or combinations thereof. Multiple types of tether group may be used in a PFA. In fact, multiple types of tether group may even be incorporated into the same chain of first polymer, or of second polymer, or of PNP. Further, when the fragmentation domain includes more than one phase, different types of tether group may be placed at different locations in the fragmentation domain. For example, if the fragmentation domain includes a polymeric shell surrounding a void, it is possible to incorporate one type of tether group on the outer surface of the shell and another type on interior surface of the shell. In this way, the positioning of catalytic components and activator components within the PFA can be precisely controlled, and more than one type of catalytic environment may be formed within a single PFA particle.

It is a further advantage of the present invention that the structure of the PFA may be constructed, for example, in a series of coagulation steps wherein different types of fragmentation domain are layered onto the PFA in successive coagulations. If desired, the amounts and types of ingredients used to produce the fragmentation zone may also be varied from one coagulation step to the next.

The PFAs of the present invention may be isolated from their aqueous dispersions or slurries as powders by well known methods including, for example, spray drying, filtration and oven drying, freeze drying, and devolatilizing extrusion. A preferred method is isolation of coagulated PFA by filtration and fluid bed drying. The PFA can then be loaded with catalytic component and, optionally activator component, typically in a carrier solvent such as an aliphatic or aromatic hydrocarbon, or mixtures thereof. It is even more preferred to prepare the PFA using a porogen that is the same as, or miscible with, the carrier solvent (e.g., aliphatic or aromatic hydrocarbon) for the catalytic component and, optionally, the activator component. In this way the PFA may be loaded in situ to form the PFA catalyst, avoiding intermediate isolation steps.

The average particle size, in microns, of the plural PFA particles useful in the present invention is typically 1 to 1000, preferably 10 to 500, more preferably 20 to 100, and most preferably 40 to 70. The polydispersity of the PSD of the plural PFA particles is typically 1.0 to 5.0, preferably 1.0 to 3.0, more preferably 1.0 to 1.5, and most preferably 1.0 to 1.3. The surface area of the PFA, in $m^2/g$ as determined by BET $N_2$ absorption, is typically 10 to 2000, preferably 50 to 1000, more preferably 100 to 800, and most preferably 200 to 800. The total amount of tether group attached to a PFA, given in mmoles of tether groups per gram of PFA, is typically 0.0 to 10, preferably 0.01 to 5.0, more preferably 0.05 to 3.0, and most preferably 0.10 to 2.0.

Stock mixtures of the "PFA catalyst" of the present invention are prepared by combining the catalytic component, optionally the activator component, and the PFA of the present invention with an anhydrous solvent. Non-polar solvents such as aliphatic and aromatic hydrocarbons are preferred. The combining of these materials is performed under anhydrous conditions using techniques well known in the art for manipulating air-sensitive materials. For example, the combining can be accomplished by manipulation of the materials in a glovebox under dry Argon atmosphere. Any solvent: that can be dried; that does not react with or otherwise deleteriously interact with the catalytic component, the activator component, the PFA, or any combination thereof; and that can solubilized the catalyst and activator components at useful concentrations may be used as a solvent for the preparation of the catalytic component, and for subsequent use in olefin polymerization. Aromatic hydrocarbons, alkyl substituted aromatic hydrocarbons, and C-4 to C-20 alkanes are preferred. In a preferred embodiment of the formation of a stock solution of catalytic component and activator component, the solvent is anhydrous toluene. A catalytic component, for example $(BuCp)_2ZrCl_2$, is combined with an activator solution, 10% MAO solution in toluene. After 15 minutes, the solution turns a pale yellow-orange color. In a preferred embodiment of the preparation of the PFA catalyst, a slurry of plural PFA particles in dry toluene is shaken while adding a stock solution of catalytic component and activator component (for example, a solution of $(BuCp)_2ZrCl_2$/MAO in toluene). The PFA particles become colored (yellow-orange in this example) while the solution becomes clear and colorless or very light in color, indicating that the catalytic component has been absorbed into the PFA. The toluene is removed under reduced pressure, and replaced with solvent (e.g., dry heptane). The slurry of PFA catalyst in solvent is transferred to a pressure reactor which is then pressurized with dry Argon and olefin monomer (see herein below) to begin the olefin polymerization. Although the method of the preferred embodiment just described involves first preparing a solution of the catalytic component and the activator component in a solvent, and adding that solution to a slurry of PFA particles in a solvent, any order of combination of the catalytic component, the activator component, PFA, and solvent may be used in the practice of the present invention. Non-limiting examples of methods of combination involving varying order of addition include: adding a solution of the activator component in solvent to a slurry of the PFA in solvent, followed by addition a solution of the catalytic component in solvent; adding a solution of the catalytic component in solvent to a slurry of the PFA in solvent, followed by addition of a solution of the activator component in solvent; adding a slurry of PFA in solvent to a solution of catalytic component, activator component, and solvent; adding a solution of catalytic component, activator component, and solvent to dry PFA; adding a solution of catalytic component in solvent to dry PFA, followed by addition of a solution of activator component in solvent; or adding a solution of activator component in solvent to dry PFA, followed by addition of a solution of catalytic component in solvent. Further methods involving use of either or both catalytic component and activator component can also be practiced in the present invention. Furthermore, multiple solvents may be used. When more than one solvent is used, it is preferred that those solvents are miscible with one another. It is further understood that, in any of the methods of combination enumerated: one or more activator components may be used; one or more catalytic components may be used; and one or more PFAs may be used.

Ziegler-Natta based PFA catalysts of the present invention for PE, PP, and their copolymers can be made by a variety of methods which will be clear to one skilled the art. The $TiCl_4$/$MgCl_2$ catalyst system is formed within the structure of the PFA, imposing the commercially-desirable spheroidal morphology on the resulting catalyst. In this way the PFA catalyst can be used in any commercial process type (gas phase, bulk monomer, slurry) to manufacture high bulk density, spherical polymer particles.

A typical method for producing the Ziegler-Natta based PFA catalyst is to introduce a suitable magnesium precursor into the PFA particle. Preferably a solution of the magnesium species is used. Suitable Mg precursors include, for example, Grignards, magnesium alkoxides, and mixed Mg/Ti alkoxides. The solvent can be removed to afford a magnesium impregnated PFA particle which is then subjected to a suitable chlorinating agent to afford $MgCl_2$ particles within the PFA. Suitable chlorinating agents are known to those skilled in the art but include, for example, $TiCl_4$, thionyl chloride, benzoyl chloride. The resulting magnesium impregnated PFA can then be treated with titanium tetrachloride to produce the PFA catalyst. (When $TiCl_4$ is used as the chlorinating agent, treatment with more titanium tetrachloride is optional.) Typically this last step is carried out at temperatures in the range of 80-120° C. and then the resulting PFA catalyst is washed with excess aliphatic hydrocarbon (to remove any soluble titanium species that would cause reactor fouling and, in the case of PP, atactic PP generation). PFA catalysts made in the absence of any electron donors are suitable for PE production. In addition to any electron donors that may be present in tether groups, electron donors can be incorporated into the PFA catalyst to enhance catalyst activity and, in the case of PP, to enhance stereoselectivity. Suitable electron donors include, THF, aromatic esters such as ethylbenzoate, phthalates such as di-n-butyl phthalate, and diethers. Preferred electron donor families for PP catalysts are aromatic esters such as ethylbenzoate, phthalates such as di-n-butyl phthalate and diethers.

The "catalytic components" usefully employed in accordance with the invention are organometallic compositions of transition metals. The transition metal catalysts preferably are of the Ziegler-Natta type or Phillips type catalysts and more preferably are single site catalysts, such as a Unipol™ catalyst, Insite™ catalyst or Versipol™ catalyst. The most preferred catalysts are based on organometallic compounds of zirconium, titanium, chromium, vanadium, iron, cobalt, palladium, copper, and nickel.

Illustrative, but not limiting examples of bis(cyclopentadienyl) group 4 metal compounds which may be used as the catalytic component in the preparation of the catalyst composition of the present invention are listed below:

dihydrocarbyl-substituted bis(cyclopentadienyl)zirconium compounds, including bis(cyclopentadienyl)zirconium dichloride, bis(cyclopentadienyl)zirconium dimethyl, bis(cyclopentadienyl)zirconium diethyl, bis(cyclopentadienyl)zirconium dipropyl, bis(cyclopentadienyl)zirconium dibutyl, bis(cyclopentadienyl)zirconium diphenyl, bis(cyclopentadienyl)zirconium dineopentyl, bis(cyclopentadienyl)zirconium di(m-tolyl), bis(cyclopentadienyl)zirconium di(p-tolyl) and chemically/structurally related compounds; dihydrido-substituted bis(cyclopentadienyl)zirconium compounds, including bis(cyclopentadienyl)zirconium dihydride, and chemically/structurally related compounds; hydrido halide-substituted bis(cyclopentadienyl)zirconium compounds, including bis(cyclopentadienyl)zirconium hydrido chloride, and chemically/structurally related compounds; hydrocarbyl hydride-substituted bis(cyclopentadienyl)zirconium compounds including bis(cyclopentadienyl)zirconium methyl hydride, bis(pentamethylcyclopentadienyl)zirconium(phenyl)(hydride), bis(pentamethylcyclopentadienyl)zirconium(methyl)(hydride), and chemically/structurally related compounds; (monohydrocarbyl-substituted cyclopentadienyl)zirconium compounds including (methylcyclopentadienyl)(cyclopentadienyl)zirconium dimethyl, bis(methylcyclopentadienyl)zirconium dimethyl, bis(dibutylcyclopentadienyl)zirconium dimethyl, and chemically/structurally related compounds;

(polyhydrocarbyl-substituted-cyclopentadienyl)zirconium compounds, including (dimethylcyclopentadienyl)(cyclopentadienyl)zirconium dimethyl, bis(dimethylcyclopentadienyl)zirconium dimethyl, bis(pentamethylcyclopentadienyl)zirconium dimethyl, and chemically/structurally related compounds, compounds in which the dimethyl portion is replaced by dichloride;

(bridged-cyclopentadienyl)zirconium compounds, including methylene bis(cyclopentadienyl)zirconium dimethyl, methylene bis(cyclopentadienyl)zirconium dihydride, ethylene bis(cyclopentadienyl)zirconium dimethyl, dimethylsilylbis(cyclopentadienyl)zirconium dimethyl, ethylenebis(cyclopentadienyl)zirconium dihydride, dimethylsilyl bis(cyclopentadienyl)zirconium dihydride, and chemically/structurally related compounds, and the corresponding dichlorides;

chiral and $C_2$-symmetry compounds; asymetrically bridged-dicylopentadienyl compounds, including methylene(cyclopentadienyl)(1-fluorenyl)zirconium dimethyl, dimethysilyl(cyclopentadienyl)(1-fluorenyl)zirconium dihydride, isopropyl(cyclopentadienyl)(1-fluorenyl)zirconium dimethyl, isopropyl(cyclopentadienyl)1-octahydrofluorenyl)zirconium dimethyl, dimethylsil(methylcyclopentadienyl)(1-fluorenyl)zirconium dihydride, methylene(cyclopentadienyl(tetramethylcyclopentadienyl)zirconium dimethyl, and chemically/structurally related compounds, and the corresponding dichlorides;

racemic and meso isomers of symmetrically bridged substituted dicyclopentadienyl compounds, including ethylenebis(indenyl)zirconium dimethyl, dimethylsilylbis(indenyl)zirconium dimethyl, ethylenebis(tetrahydroindenyl) zirconium dimethyl, and dimethylsilylbis(3-trimethylsilylcyclopentadientyl)zirconium dihydride;

zirconacycles, including bis(pentamethylcyclopentadienyl) zirconacyclobutane, bis(pentamethylcyclopentadienyl) zirconacyclopentane, bis(cyclopentadienyl)zirconaindane, and 1-bis(cyclopentadienyl)zircona-3-dimethylsilacyclobutane;

olefin, diolefin and aryne ligand substituted bis(cyclopentadienyl)zirconium compounds, inncluding bis(cyclopentadienyl)(1,3-butadiene)zirconium, bis(cyclopentadienyl)(2,3-dimethyl-1,3butadiene)zirconium, and bis(pentamethylcyclopentadienyl)(benzyne)zirconium; and bis(cyclopentadienyl)zirconium compounds in which a substituent on the cyclopentadienyl radical is bound to the metal, including (pentamethylcyclopentadienyl)(tetramethylcyclopentadienylmethylene)zirconium, hydride, (pentamethylcyclopentadienyl), (tetramethylcyclopentadienylmethylne)zirconium phenyl, and chemically/structurally related compounds.

Illustrative, but non-limiting examples of bis(cyclopentadienyl)hafnium and bis(cyclopentadienyl)titanium compounds that, as the catalytic component, usefully comprise the catalyst composition of the present invention are disclosed in publications of Alt and Koeppl, such as Chem. Rev., 100, 1205-1222, 2000 and Hlatky, Chem. Rev., 100, 1347-1376, 2000, the contents of which are usefully employed in accordance with the invention. Chemically and structurally related bis(cyclopentadienyl)hafnium compounds and bis(cyclopentadienyl)titanium compounds as well as other catalysts of Group 4 metals that are useful in the catalyst composition of the present invention would be apparent to those skilled in the art based on their respective chemical structures and reactivities in olefin polymerizations.

Illustrative, but non-limiting examples of Group 4 and 6 compounds containing a cyclopentadienyl ring bridging to a nitrogen group via a carbon or silicon group which may be used in the preparation of the catalytic composition of the present invention include:

dimethylsilycyclopentadienyl-tertbutylamido zirconium dimethyl, dimethylsilycyclopentadienyl-tertbutylamido titanium dimethyl, dimethylsilytetramethylcyclopentadienyl-tertbutylamido zirconium dimethyl, dimethylsilytertbutylcyclopentadienyl-tertbutylamido zirconium dimethyl, dimethylsilytetramethylcyclopentadienyl-tertbutylamido titanium dimethyl, dimethylsilytertbutylcyclopentadienyl-tertbutylamido titanium dimethyl, dimethylsilytetramethylcyclopentadienyl-tertbutylamido hafnium dimethyl, dimethylsilytertbutylcyclopentadienyl-tertbutylamido hafnium dimethyl, dimethylsilytetramethylcyclopentadienyl-tertbutylamido zirconium dimethyl, ethylenetetramethylcyclopentadienyldimethylamino chromium dimethyl, and the corresponding dichlorides.

Illustrative but non-limiting examples of Group 4 or 6 metal complexes containing bidentate, tridentate or other multidentate ligands that, as the catalytic component, usefully comprise the catalyst composition of the present invention include:

(NC(CH3)2CH2CH2C(CH3)2N)Cr(CH2C6H5)2, and bis[N-(3-t-butylsalicylidene)phenylaminato]zirconium dichloride.

Illustrative but non-limiting examples of Group 8-11 metal complexes containing bidentate, tridentate or other multidentate ligands that, as the catalytic component, usefully comprise the catalyst composition of the present invention are disclosed in publications of Ittel and Brookhart, such as Chem. Rev., 100, 1169-1203, 2000, Hlatky, Chem. Rev., 100, 1347-1376, 2000, and Gibson, Angew, Chem. Int. Ed. 38, 428-447, the contents of which are usefully employed in accordance with the present invention. Preferred of Group 8-11 catalysts that, as the catalytic component, usefully comprise the catalyst composition of the present invention are:

{(2,6-iPr$_2$C$_6$H$_3$)—N═C(H)—C(H)═N-(2,6-iPr$_2$C$_6$H$_3$)}NiBr$_2$,

{(2,6-iPr$_2$C$_6$H$_3$)—N=C(Me)-C(Me)=N-(2,6-iPr$_2$C$_6$H$_3$)} NiBr$_2$,
{(2,6-iPr$_2$C$_6$H$_3$)—N=C(Ph)-C(Ph)=N-(2,6-iPr$_2$C$_6$H$_3$)} NiBr2,
{(2,6-Me$_2$C$_6$H$_3$)—N=C(H)—C(H)=N-(2,6-Me$_2$C$_6$H$_3$)} NiBr2,
{(2,6-Me$_2$C$_6$H$_3$)—N=C(Me)-C(Me)=N-(2,6-Me$_2$C$_6$H$_3$)} NiBr$_2$
{(2,6-Me$_2$C$_6$H$_3$)—N=C(Ph)-C(Ph)=N-(2,6-Me$_2$C$_6$H$_3$)} NiBr$_2$,
{(2,6-iPr$_2$C$_6$H$_3$)—N=C(H)—C(H)=N-(2,6-iPr$_2$C$_6$H$_3$)}Pd(Cl)Me,
[{(2,6-iPr$_2$C$_6$H$_3$)—N=C(Me)-C(Me)=N-(2,6-iPr$_2$C$_6$H$_3$)} PdMe(NC-Me)]+,
[{(2,6-iPr$_2$C$_6$H$_3$)—N=C(Ph)-C(Ph)=N-(2,6-iPr$_2$C$_6$H$_3$)} PdMe(NC-Me)]+,
[{(2,6-iPr$_2$C$_6$H$_3$)—N=C(H)—C(H)=N-(2,6-iPr$_2$C$_6$H$_3$)} PdMe(NC-Me)]+,
[{(2,6-iPr$_2$C$_6$H$_3$)—N=C(Me)-C(Me)=N-(2,6-iPr$_2$C$_6$H,)} PdMe(NC-Me)]+,
[{(2,6-iPr$_2$C$_6$H$_3$)—N=C(Ph)C(Ph)=N-(2,6-iPr$_2$C$_6$H$_3$)} PdMe(NC-Me)]+,
[{(2,6-iPr$_2$C$_6$H$_3$)—N=C(Me)-C(Me)=N-(2,6-iPr$_2$C$_6$H$_3$)} NiMe(OEt$_2$)]+,
[{(2,6-iPr$_2$C$_6$H$_3$)—N=C(Ph)-C(Ph)=N-(2,6-iPr$_2$C$_6$H$_3$)} NiMe(OEt$_2$)]+,
{[(2,6-PhN=C(CH$_3$))$_2$C$_5$H$_3$N]CoCl$_2$, ([(2,6-PhN=C(CH$_3$))$_2$C$_5$H$_3$N]FeCl$_2$},
{[(2,6-PhN=C(CH$_3$))$_2$C$_5$H$_3$N]CoCl$_3$}, {[(2,6-PhN=C(CH$_3$))$_2$C$_5$H$_3$N]FeCl$_3$}, and bis (2,2'-bipyridyl) iron diethyl.

Chemically and structurally related catalytically active Iron, Cobalt, Nickel, Palladium, and Copper compounds as well as other catalysts of Group 8-11 metals that are useful in the catalyst composition of the present invention would be apparent to those skilled in the art based on their respective chemical structures and reactivities in olefin polymerizations.

The "catalytic component" of the present invention is typically a component in the "PFA catalyst" of the present invention at a concentration of 0.0001 mmole/gram to 2.00 mmoles/g, preferably 0.0001 mmole/g to 1.5 mmoles/g, more preferably 0.0005 mmole/g to 1.5 mmoles/g, and most preferably 0.001 mmole/g to 1.00 mmole/g, defined as mmoles of metal per gram of PFA (dry weight).

Activator components for these PFA catalysts may be tri-alkylaluminums such as triethyl or triisobutyl aluminum. When used for PP manufacture, the catalysts are typically used in combination with third components (electron donors) to enhance stereoselectivity. In the case of catalysts with aromatic esters as internal donors the preferred third components (or external donors) are also aromatic esters such as para-ethoxy-ethylbenzoate and the like, where phthalates are used as internal donors the preferred external donors are silanes such as dialkyl dialkoxy silanes like dicyclohexyl-dipropoxy silanes, in the case of the diethers no external donor is strictly essential but optionally the silane donors can be used to further improve stereo selectivity.

Illustrative, but non-limiting examples of the "activator component" that usefully comprises the "PFA catalyst" of the present invention are disclosed in publications of Chen and Marks, such as Chem. Rev., 100, 1391-1434, 2000, Coates, such as Chem. Rev., 100, 1223-1252, 2000, Resconi et al, such as Chem. Rev., 100, 1253-1346, 2000, Fink et al, such as Chem. Rev., 100, 1377-1390, 2000 Alt and Koeppl, such as Chem. Rev., 100, 1205-1222, 2000 and Hlatky, Chem. Rev., 100, 1347-1376, 2000, the contents of which are usefully employed in accordance with the invention. Activator components usefully comprising the catalyst composition of the present invention, for example, include: aluminum alkyls such as AM(C2H5)3, Al(CH2CH(CH3)2)3, Al(C3H7)3, Al((CH2)3CH3)3, Al((CH2)5CH3)3, Al(C6F5)3, Al(C2H5)2Cl, Al2(C2H5)3C12, A1C13; aluminoxanes such as methylaluminoxane (MAO), modified methyl aluminoxane (MMAO), isobutylaluminoxane, butylaluminoxane, heptylaluminoxane and methylbutylaluminoxane; and combinations thereof. Both stoichiometric and non-stoichiometric quantities of activator components are usefully employed in the "PFA catalyst" of the present invention. Chemically and structurally useful aluminum compounds as well as other catalysts of Group 13 elements that are useful in the catalyst composition of the present invention would be apparent to those skilled in the art based on their respective chemical structures and activities in olefin polymerizations.

The activator component further comprises hydroxyaluminoxanes. Hydroxyaluminoxanes, and methods of preparing them, are disclosed in U.S. Pat. No. 6,160,145. The hydroxyaluminoxane has a hydroxyl group bonded to at least one of its aluminum atoms. To form these hydroxyaluminoxanes, a sufficient amount of water is reacted with an alkyl aluminum compound to result in formation of a compound having at least one HO—Al group and having sufficient stability to allow reaction with a d- or f-block organometallic compound to form a hydrocarbon.

The alkyl aluminum compound used in forming the hydroxyaluminoxane reactant can be any suitable alkyl aluminum compound other than trimethylaluminum. Thus at least one alkyl group has two or more carbon atoms. Preferably each alkyl group in the alkyl aluminum compound has at least two carbon atoms. More preferably each alkyl group has in the range of 2 to about 24, and still more preferably in the range of 2 to about 16 carbon atoms. Most preferred are alkyl groups that have in the range of 2 to about 9 carbon atoms each. The alkyl groups can be cyclic (e.g., cycloalkyl, alkyl-substituted cycloalkyl, or cycloalkyl-substituted alkyl groups) or acyclic, linear or branched chain alkyl groups. Preferably the alkyl aluminum compound contains at least one, desirably at least two, and most preferably three branched chained alkyl groups in the molecule. Most preferably each alkyl group of the aluminum alkyl is a primary alkyl group, i.e., the alpha-carbon atom of each alkyl group carries two hydrogen atoms.

Suitable aluminum alkyl compounds which may be used to form the hydroxyaluminoxane reactant include dialkylaluminum hydrides and aluminum trialkyls. Examples of the dialkylaluminum hydrides include diethylaluminum hydride, dipropylaluminum hydride, diisobutylaluminum hydride, di(2,4,4-trimethylpentyl)aluminum hydride, di(2-ethylhexyl)aluminum hydride, di(2-butyloctyl)aluminum hydride, di(2,4,4,6,6-pentamethylheptyl)aluminum hydride, di(2-hexyldecyl)aluminum hydride, dicyclopropylcarbinylaluminum hydride, dicyclohexylaluminum hydride, dicyclopentylcarbinylaluminum hydride, and analogous dialkylaluminum hydrides. Examples of trialkylaluminum compounds which may be used to form the hydroxyaluminoxane include triethylaluminum, tripropylaluminum, tributylaluminum, tripentylaluminum, trihexylaluminum, triheptylaluminum, trioctylaluminum, and their higher straight chain homologs; triisobutylaluminum, tris(2,4,4-trimethylpentyl)aluminum, tri-2-ethylhexylaluminum, tris(2,4,4,6,6-pentamethylheptyl) aluminum, tris(2-butyloctyl)aluminum, tris(2-hexyldecyl) aluminum, tris(2-heptylundecyl)aluminum, and their higher branched chain homologs; tri(cyclohexylcarbinyl)aluminum, tri(2-cyclohexylethyl)aluminum and analogous cycloaliphatic aluminum trialkyls; and Tri(pentafluoro)aluminum. Triisobutylaluminum has proven to be an especially desirable alkyl aluminum compound for producing a hydroxyaluminoxane. Hydroxyisobutylaluminoxane (HOI-BAO) is a preferred hydroxyaluminoxane. The hydroxy-isobutylaluminoxane is essentially devoid of unreacted tri-isobutylaluminum. Useful activator components further include aluminoxane salt compositions (aluminoxinates) as disclosed in U.S. Pat. No. 5,922,631.

Activator components useful in the present invention further include organic borane compounds, inorganic borane compounds, and borate anions. Preferred examples of boron containing activator components employed in the PFA catalyst of the present invention are trifluoroborane, triphenylborane, Tris(4-fluorophenyl)borane, Tris(3,5-difluorophenyl)borane, Tris(4-fluoromethylphenyl)borane, Tris(pentafluorophenyl)borane, Tris(tolyl)borane, Tris(3,5-dimethylphenyl)borane, Tris(3,5-difluorophenyl)borane, Tris(3,4,5-trifluorophenyl)borane, Dimethylanilinium(pentafluorophenyl) borate, sodium[B{3,5-$(CF_3)_2C_6F_3$}$_4$], [H(OEt$_2$)$_1$][B{3,5-$(CF_3)_2C_6F_3$}$_4$]. Both stoichiometric and non-stoichiometric quantities of activators are usefully employed in the catalyst matrix of the present invention using triaryl carbenium tetraarylborates, N,N-dialkylanilinium salts such as N,N-dimethylanilinium tetra(pentafluorophenyl)borate, N,N-diethylanilinium tetra(phenyl)borate, N,N-2,4,6-pentamethylanilinium tetraphenylborate and chemically related Group 13 compounds; dialkyl ammonium salts such as di(i-propyl)ammonium tetra(pentafluorophenyl)borate, dicyclohexylammonium tetra(phenyl)boron and chemically related Group 13 compounds; triaryl phosphonium salts such as triphenylphosphonium tetraphenylborate, tri(methylphenyl)phosphonium tetra(phenyl)borate, tri(dimethylphenyl)phosphonium tetra(phenyl)borate and chemically related Group 13 compounds. Any complex anions or compounds forming such anions that exhibit an ability to abstract and activate the metal compounds would be within the scope of the catalyst composition of the present invention. Chemically and structurally useful boron compounds that are useful in the PFA catalyst of the present invention would be apparent to those skilled in the art based on their respective chemical structures and activities in olefin polymerizations.

The "activator component" of the present invention is an aluminum containing activator, it is typically present at a concentration of 0.01 mmole/gram to 50 mmoles/g, preferably 0.01 mmole/g to 20 mmoles/g, more preferably 0.05 mmole/g to 10 mmoles/g, and most preferably 0.1 mmole/g to 5 mmole/g, defined as mmoles of aluminum per gram of PFA (dry weight). When the activator component is boron based, it is typically present at a concentration of 0.0001 mmole/gram to 50 mmoles/g, preferably 0.0001 mmole/g to 20 mmoles/g, more preferably 0.0005 mmole/g to 10 mmoles/g, and most preferably 0.001 mmole/g to 5 mmole/g, defined as mmoles of boron per gram of PFA (dry weight).

The present invention also provides a general process for the production of specific polyolefins by judicious selection of catalytic component, activator component, and PFA. The process comprises polymerizing olefins such as ethylene or propylene alone or in the presence of higher α-olefins, diolefins or cycloolefins in the presence of the PFA catalyst. Combinations of the above catalytic components within the PFA catalyst have utility in accordance with process of the present invention.

The advantages of the invention are obtained in the ability of the tether groups of the PFA to react with, or otherwise interact with, commercially important catalytic components, and optionally activator components, for olefin polymerization, the resulting PFA catalysts having utility in the polymerization of a range of olefin monomers. The reaction of the tether groups of the PFA with the catalytic components and activator components affords additional advantages, namely, stabilizing, activating and supporting the catalysts. In addition, precision control of the structure and composition of the PFA is possible such that fragmentation is confined to the olefin polymerization process, and then only to the extent that the fragmentation domains move away from one another without detaching from the PFA particle.

The present invention is directed to a PFA catalyst for the polymerization of olefins, the PFA catalyst being formed by reaction, or other interaction, of a PFA, a catalytic component, and, optionally, an activator component. The PFA catalyst has utility in a general catalytic process for polymerization of olefins. In particular, the process of catalytically converting ethylene to higher molecular weight polyethylene homopolymers, such as high density polyethylene (HDPE) and linear low density polyethylene (LLDPE), and copolymers with alpha-olefins such as 1-butene, 1-hexene and 1-octene. These olefin polymers are intended for processing into articles of manufacture by extrusion, injection molding, thermoforming, rotational molding, hot melt processing and related techniques. In addition, the polyolefins of the present invention are homopolymers of ethylene and propylene, copolymers of ethylene and propylene with higher alpha-olefins or diolefins, and stereoregular polymers of propylene.

In accordance with the present invention, polyolefins can be prepared from olefin monomers using a PFA catalyst in a catalytic process with olefin monomers such as unbranched aliphatic olefins having from 2 to 12 carbon atoms, branched aliphatic olefins having from 4 to 12 carbon atoms, unbranched and branched aliphatic α-olefins having from 2 to 12 carbon atoms, conjugated olefins having 4 to 12 carbon atoms, aromatic olefins having from 8 to 20 carbons, unbranched and branched cycloolefins having 3 to 12 carbon atoms, unbranched and branched acetylenes having 2 to 12 carbon atoms, and combinations thereof. Also in accordance with the invention, olefin monomer further comprises polar olefin monomers having from 2 to 60 carbon atoms and at least one atom such as O, N, B, Al, S, P, Si, F, Cl, Br and combinations thereof.

In particular, the olefin monomer is ethylene, propene, 1-butene, 1-hexene, butadiene, 1,6-hexadiene, styrene, alpha-methylstyrene, cyclopentene, cyclohexene, cyclohexadiene, norbornene, norbornadiene, cyclooctadiene, divinylbenzene, trivinylbenzene, acetylene, diacetylene, alkynylbenzene, dialkynylbenzene, ethylene/1-butene, ethylene/isoprene, ethylene/1-hexene, ethylene/1-octene, ethylene/propene, ethylene/cyclopentene, ethylene/cyclohexene, ethylene/butadiene, ethylene/1,6-hexadiene, ethylene/styrene, ethylene/acetylene, propene/1-butene, propene/styrene, propene/butadiene, propylene/1-hexene, propene/acetylene, ethylene/propene/1-butene, ethylene/propene/1-hexene, ethylene/propene/1-octene, and various combinations thereof.

In one embodiment, the PFA catalyst of the present invention can be usefully employed with many catalytic components and, optionally, activator components exhibiting high activities in ethylene homopolymerization and copolymerization of ethylene/higher ax-olefins, allowing the synthesis of ethylene homopolymers and copolymers with narrow molecular weight distributions and/or homogeneous branching distributions. The HDPE and LLDPE resins prepared are intended for use in: the production of films with relatively high impact strength and clarity; fabrication into articles and useful objects by extrusion, injection molding, thermoforming, rotational molding, holt melt processing; processing of polyethylenes having monodisperse, inorganic particulate additives or modifiers; and the processing of coated surfaces, articles and useful objects using polymers comprising ethylene.

An embodiment illustrative of the general utility of the PFA catalyst is the production of polyethylene. All three classes of the polyethylene (PE), namely high density polyethylene (HDPE), low density polyethylene (LDPE) and linear low density polyethylene (LLDPE), each class of which requires a different catalyst system currently, can be prepared using the PFA catalyst of the present invention. HDPE is a linear, semi-crystalline ethylene homopolymer prepared using Ziegler-Natta and Chromium based polymerization methods. LLDPE is a random copolymer of ethylene and α-olefins (such as 1-butene, 1-hexene or 1-octene) prepared commercially using Ziegler-Natta, Chromium based or metallocene based catalysts. LDPE is a branched ethylene homopolymer prepared commercially using a high temperature and high pressure process. HDPE, LDPE and LLDPE can all be prepared by reacting olefins with the PFA catalysts of the present invention.

Another embodiment illustrative of the general utility of the PFA catalyst is the production of copolymers of ethylene and higher alpha-olefins. When making polymers, Ziegler-Natta catalysts typically produce polyethylene resins of moderately broad to very broad molecular weight distribution, as characterized by MWD values greater than 6. The occurrence of broad molecular weight distributions in such catalyst systems is attributed to inhomogeneous catalytic sites. By reacting a PFA with a Ziegler-Natta catalyst and forming the PFA catalyst of the present invention, the polymerization of ethylene can lead to narrower molecular weight distributions, as characterized by MWD values less than 6.

In another useful embodiment of the present invention, polycyclic copolymers are prepared which comprise repeating units copolymerized from at least one polycycloolefin monomer and at least one acrylate or methacrylate monomer. Used herein, the term polycycloolefin means a norbornene-type monomer. The term norbornene-type monomer is meant to include norbornene, substituted norbornene(s), and any higher cyclic derivatives thereof so long as the monomer contains at least one norbornene or substituted norbornene moiety. The substituted norbornenes and higher cyclic derivatives thereof contain a pendant hydrocarbyl substituent(s) or a functional substituent(s) containing an oxygen atom. These polycyclic copolymers and a list of the monomers useful in preparing them are disclosed in US-B1-2001-6,265,506 and US-B1-2001-6,303,724.

In the process of the present invention, olefins such as ethylene or propylene, either alone or together with higher alpha-olefins having 3 or more carbons atoms, are polymerized in the presence of a PFA catalyst, itself formed by combining a PFA with at least one catalytic component and at least one activator component. In accordance with the present invention, one can also produce olefin copolymers of ethylene and higher alpha-olefins having 3-20 carbon atoms. Comonomer content can be controlled through selection of PFA, catalytic component, and activator component.

Precision fragmentation assemblages of the present invention are also useful as delivery structures, affording controlled release of active ingredients including, but not limited to, pharmaceuticals, biocides, herbicides, mildewcides, insecticides, fungicides, fertilizers, cosmetics, fragrances, liquid crystals, and colorants such as pigments, pleochroic dyes, and non-pleochroic dyes. They are especially useful for providing dual and multiple release mechanisms, including triggered release.

The PFAs of the present invention may further be used as enzyme immobilization supports, particularly when controlled degradation of the support is desired.

The PFAs of the present invention are also useful as macroreticular resins. The PFAs are suitable for essentially any application for which traditional macroreticular resins currently used. In particular, PFAs offer advantages of traditional macroreticular resins in affording better control of access of substances to the interior of the PFA relative to traditional macroreticular resin, and better flow characteristics (e.g., lower pressure drops) in packed columns. The PFAs may be suitably functionalized (e.g., with tether groups having acidic or basic functionality) to produce ion exchange resins. Beyond spherical particles, PFAs may be produced as monoliths in which the PFA is a monolithic structure made in essentially any shape and any size. For example, the PFA monolith has a cylindrical shape, having a diameter of several centimeters and a length of a several meters.

Experimental

Determination of level of ethylenically unsaturated groups in PFAs. Solid state 13C NMR (nuclear magnetic resonance) was used to characterize and quantify the amount of ethylenically unsaturated groups contained in the PFAs useful in the present invention.

Determination of porosity. The porosities of PFAs described herein by example were measured by Nitrogen adsorption according to methods disclosed by Brunauer, et al., J. Am. Chem Soc. 60, 309 (1938).

Molecular Weight Determination using Gel Permeation Chromatography (GPC). Gel Permeation Chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p.81-84.

For example, the molecular weight information for a low molecular weight sample (e.g., 10,000) may be determined as follows. The sample (an aqueous emulsion containing low molecular weight particles) is dissolved in THF at a concentration of approximately 0.1% weight sample per volume THF, and shaken for 6 hours, followed by filtration through a 0.45 μm PTFE (polytetrafluoroethylene) membrane filter. The analysis is performed by injecting 100 μl of the above solution onto 3 columns, connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is via differential refractive index. The system was calibrated with narrow polystyrene standards. PMMA-equivalent molecular weights for the sample are calculated via Mark-Houwink correction using $K=14.1\times10^{-3}$ ml/g and $a=0.70$ for the polystyrene standards and $K=10.4\times 10^{-3}$ ml/g and $a=0.697$ for the sample.

EXPERIMENTAL EXAMPLES

Some embodiments of the invention will now be described in detail in the following Examples. The following abbreviations shown in Table 1 are used in the examples.

TABLE 1

Abbreviations

| Abbreviation | Description |
| --- | --- |
| ALMA | Allyl methacrylate |
| BA | Butyl acrylate |
| BMA | Butyl methacrylate |
| EA | Ethyl acrylate |
| GC | Gas chromatograph |
| GMA | Glycidyl methacrylate |
| HEMA | Hydroxyethyl methacrylate |
| HPLC | High performance liquid chromatography |
| Init. | Initiator |
| IR | Infrared spectroscopy |
| MAA | Methacrylic acid |
| MMA | Methyl methacrylate |
| MCPBA | m-chloroperoxybenzoic acid (nominal 75% active) |
| AOH | allyl alcohol |
| Sty | Styrene |

Example 1.1

Preparation of Fragmentation Domains by Emulsion Polymerization

Initially, 1831 grams of water, 7 grams of sodium lauryl sulfate (28% solution in water), and 0.5 grams of acetic acid were added to a 5 liter round bottom flask fitted with a paddle stirrer, thermometer, nitrogen sparge, and heating mantel. A first monomer emulsion was prepared separately by emulsifying 800 grams of styrene, 200 grams of divinyl benzene, 36 grams of sodium lauryl sulfate (28% solution in water), and 311 grams of water in a 2 liter beaker, using a high speed mixer. An initiator solution was prepared by mixing, in a 150 ml beaker, 2 grams of t-butyl hydroperoxide (70% solution in water) with 98 grams of water. A reducing agent solution was prepared by mixing, in a 150 ml beaker, a solution of 2 grams of sodium hydroxy methane sulfinate (78% as a hydrate) with 98 grams of water. The kettle charge was heated to 70° C. The monomer emulsion, initiator solution, and reducing agent mixtures were fed to the kettle simultaneously, but separately, while maintaining a reaction temperature of 70° C. All feeds were begun at the same time. The duration of the monomer feed was 75 minutes, while the duration of the other feeds was 100 minutes. The batch was held for 30 minutes after completion of the feeds, and then cooled to 25° C. The final polymer content of the fragmentation domain latex (here, the "first polymer" is a styrene/DVB copolymer) was determined gravimetrically to be 29% (non-volatile weight/total latex weight), representing a 97% yield of polymer (the theoretical value for final polymer content was 30%). Residual styrene monomer, determined by headspace gas chromatography, was less than 500 parts per million in the fragmentation domain latex sample. The fragmentation domain particle size was measured to be 150 nm by light scattering and scanning electron microscopy. Some of the latex was dried and then extracted with toluene. The toluene soluble polymer fraction was less than 0.2% by weight of the dried fragmentation domain sample, indicating a very high degree of crosslinking in the fragmentation domains.

Example 1.2

Preparation of Fragmentation Domains by Emulsion Polymerization

Initially, 1831 grams of water, 7 grams of sodium lauryl sulfate (28% solution in water), and 0.5 grams of acetic acid are added to a 5 liter round bottom flask fitted with a paddle stirrer, thermometer, nitrogen sparge, and heating mantel. A first monomer emulsion is prepared separately by emulsifying 1,000 grams of a first monomer composition (see monomers 1, 2, and 3 in Table 1.2), 36 grams of sodium lauryl sulfate (28% solution in water), and 311 grams of water in a 2 liter beaker, using a high speed mixer. An initiator solution is prepared by mixing, in a 150 ml beaker, 2 grams of t-butyl hydroperoxide (70% solution in water) with 98 grams of water. A reducing agent solution is prepared by mixing, in a 150 ml beaker, a solution of 2 grams of sodium hydroxy methane sulfinate (78% as a hydrate) with 98 grams of water. The kettle charge is heated to 70° C. The monomer emulsion, initiator solution, and reducing agent mixtures are fed to the kettle simultaneously, but separately, while maintaining a reaction temperature of 70° C. All feeds are begun at the same time. The duration of the monomer emulsion feed is 75 minutes, while the duration of the other feeds is 100 minutes. The batch is held for 30 minutes after completion of the feeds, and then cooled to 25° C. The final polymer content of the fragmentation domain latex (here, the "first polymer" has the composition, as polymerized units, of the monomer composition), as determined gravimetrically, is expected to be approximately 29% (non-volatile weight/total latex weight), representing a 97% yield of polymer (the theoretical value for final polymer content was 30%). Residual total monomer, determined by headspace gas chromatography, should be less than 500 parts per million in the fragmentation domain latex sample. The fragmentation domain particle size in nanometers is 150 nm by light scattering and scanning electron microscopy. Some of the latex is dried and then extracted with toluene. The toluene soluble polymer fraction should be less than 0.2% by weight of the dried fragmentation domain sample, indicating a very high degree of crosslinking in the fragmentation domains.

TABLE 1.2

Monomer charges for the preparations of Example 1.2.

| Example Number | Monomer 1 | Monomer 1 weight, grams | Monomer 2 | Monomer 2 weight, grams | Monomer 3 | Monomer 3 weight, grams |
| --- | --- | --- | --- | --- | --- | --- |
| 1.2.A | MMA | 820 | ALMA | 50 | HEMA | 130[a] |
| 1.2.B | MMA | 690 | ALMA | 50 | HEMA | 260[a] |
| 1.2.C | MMA | 808 | ALMA | 50 | GMA | 142[b] |
| 1.2.D | MMA | 666 | ALMA | 50 | GMA | 284[b] |
| 1.2.E | Sty | 742 | DVB | 200 | AOH | 58[c] |
| 1.2.F | Sty | 684 | DVB | 200 | AOH | 116[c] |

TABLE 1.2-continued

Monomer charges for the preparations of Example 1.2.

| Example Number | Monomer 1 | Monomer 1 weight, grams | Monomer 2 | Monomer 2 weight, grams | Monomer 3 | Monomer 3 weight, grams |
|---|---|---|---|---|---|---|
| 1.2.G | DVB | 1000 | | | | |
| 1.2.H | MMA | 950 | ALMA | 50 | | |
| 1.2.I | MMA | 950 | BDMA | 50 | | |

[a]HEMA: 130 g = 1.00 mole; 260 g = 2.00 mole;
[b]GMA: 142 g = 1.00 mole; 284 g = 2.00 mole;
[c]AOH: 58 g = 1.00 mole; 116 g = 2.00 mole).

Example 1.3

Preparation of Fragmentation Domains by Emulsion Polymerization

Initially, 1793 grams of water, 53.9 grams of Example 1.2 fragmentation domain latex (particle size=150 nm; used as seed to produce 600 nm fragmentation domains) and 0.5 grams of acetic acid are added to a 5 liter round bottom flask fitted with a paddle stirrer, thermometer, nitrogen sparge, and heating mantel. A first monomer emulsion is prepared separately by emulsifying 984.4 grams of a first monomer composition (see monomers 1, 2, and 3 in Table 1.3), 42.4 grams of sodium lauryl sulfate (28% solution in water, see Table 1.2), and 311 grams of water in a 2 liter beaker, using a high speed mixer. An initiator solution is prepared by mixing, in a 150 ml beaker, 2 grams of t-butyl hydroperoxide (70% solution in water) with 98 grams of water. A reducing agent solution is prepared by mixing, in a 150 ml beaker, a solution of 2 grams of sodium hydroxy methane sulfinate (78% as a hydrate) with 98 grams of water. The kettle charge is heated to 70° C. The monomer emulsion, initiator solution, and reducing agent mixtures are fed to the kettle simultaneously, but separately, while maintaining a reaction temperature of 70° C. All feeds are begun at the same time. The duration of the monomer emulsion feed is 75 minutes, while the duration of the other feeds is 100 minutes. The batch is held for 30 minutes after completion of the feeds, and then cooled to 25° C. The final polymer content of the fragmentation domain latex (here, the "first polymer" has the composition, as polymerized units, of the monomer composition), as determined gravimetrically, is expected to be approximately 29% (non-volatile weight/total latex weight), representing a 97% yield of polymer (the theoretical value for final polymer content was 30%). Residual total monomer, determined by headspace gas chromatography, should be less than 500 parts per million in the fragmentation domain latex sample. The fragmentation domain particle size is 600 nanometers as determined by light scattering and scanning electron microscopy. Some of the latex is dried and then extracted with toluene. The toluene soluble polymer fraction should be less than 0.2% by weight of the dried fragmentation domain sample, indicating a very high degree of crosslinking in the fragmentation domains.

TABLE 1.3

Monomer charges for the preparations of Example 1.3.

| Example Number | Seed[a] | Monomer 1 | Monomer 1 weight, grams | Monomer 2 | Monomer 2 weight, grams | Monomer 3 | Monomer 3 weight, grams |
|---|---|---|---|---|---|---|---|
| 1.3.A | 1.2.A | MMA | 820 | ALMA | 50 | HEMA | 130[b] |
| 1.3.B | 1.2.B | MMA | 690 | ALMA | 50 | HEMA | 260[b] |
| 1.3.C | 1.2.C | MMA | 808 | ALMA | 50 | GMA | 142[c] |
| 1.3.D | 1.2.D | MMA | 666 | ALMA | 50 | GMA | 284[c] |
| 1.3.E | 1.2.F | Sty | 742 | DVB | 200 | AOH | 58[d] |
| 1.3.F | 1.2.G | Sty | 684 | DVB | 200 | AOH | 116[d] |
| 1.3.G | 1.2.J | DVB | 1000 | | | | |
| 1.3.H | 1.2.K | MMA | 950 | ALMA | 50 | | |
| 1.3.I | 1.2.L | MMA | 950 | BDMA | 50 | | |

[a]The seed is a fragmentation domain latex from Example 1.2;
[b]HEMA: 130 g = 1.00 mole; 260 g = 2.00 mole;
[c]GMA: 142 g = 1.00 mole; 284 g = 2.00 mole;
[d]AOH: 58 g = 1.00 mole; 116 g = 2.00 mole).

Examples 2

Preparation of Polymeric Nanoparticles (PNPs)

A 500 mL reactor is fitted with a thermocouple, a temperature controller, a purge gas inlet, a water-cooled reflux condenser with purge gas outlet, a stirrer, and an addition funnel. To the addition funnel is charged 201.60 g of a monomer mixture consisting of: monomer 1, monomer 2, and, optionally, monomer 3 (see Table 2); 1.60 g of a 75% solution of t-amyl peroxypivalate in mineral spirits (Luperox 554-M-75); and 180.00 g diisobutyl ketone ("DIBK"). The reactor, containing 180.00 g DIBK, is then flushed with nitrogen for 30 minutes before applying heat to bring the contents of the reactor to 75° C. When the contents of the reactor reaches 75° C., the monomer mixture in the addition funnel is uniformly charged to the reactor over 90 minutes. Thirty minutes after the end of the monomer mixture addition, the first of two chaser aliquots, spaced thirty minutes apart and consisting of 0.06 g of a 75% solution of t-amyl peroxypivalate in mineral spirits (Luperox 554-M-75) and 2.00 g DIBK, is added. At the end of the second chaser aliquot, the contents of the reactor are held 2½ hours at 80° C. to complete the reaction. The resulting polymer is isolated by precipitation with heptane, collected by filtration and dried under vacuum to yield a white powder. This material is redissolved in propyleneglycol monomethylether acetate. The nanoparticles thus formed should have a mean particle size of 6 nm and polydispersity of PSD of 1.5, as determined by dynamic laser light scattering and a molecular weight of 22,500 g/mol with a number average molecular weight of about 14,500 g/mol and Mw/Mn distribution of 1.6 as measured by GPC.

Example 3.1 demonstrates that agglomeration (here, coagulation) of fragmentation domains, monomer, and porogen (toluene) may be followed, to good effect, by polymerization of the monomer to form second polymer within the interstitial space among the fragmentation domains. During the polymerization process, polymerization induced phase separation (PIPS) occurs in which the second polymer precipitates from the porogen (xylene) to form a connecting phase in the fragmentation zone (within the interstitial space) and a pore phase. In this example, the pore phase is first occupied by xylene which is then replaced by air during drying.

TABLE 2

Monomers used to prepare the PNPs of Example 1.4.

| Example Number | Monomer 1 | Monomer 1 weight, grams | Monomer 2 | Monomer 2 weight, grams | Monomer 3 | Monomer 3 weight, grams |
|---|---|---|---|---|---|---|
| 2.A | Sty | 16 | DVB | 4 | | |
| 2.B | Sty | 13 | DVB | 4 | AOH | 3 |
| 2.C | MMA | 19 | ALMA | 1 | | |
| 2.D | MMA | 16 | ALMA | 1 | HEMA | 3 |

Examples 3.1

Preparation of a Precision Fragmentation Assemblage by Coagulation Followed by Polymerization Initially, 475 grams of water and 25 grams of anhydrous magnesium sulfate were added to a 3 liter beaker fitted with a paddle stirrer, thermometer, nitrogen sparge, and heating mantel. A solvent-monomer-initiator solution was prepared by mixing, in a 100 ml beaker, 19 grams of styrene, 5 grams of divinyl benzene, 48 grams of xylene, and 0.5 grams of t-butyl peroctoate. The solvent-monomer-initiator solution (72.5 grams) was then added to a 150 ml beaker, along with 3 grams of sodium lauryl sulfate (28% solution in water) and 25 grams of water, and emulsified using a high speed ultrasonic mixer. The droplet size of the organic phase was less than about 1 micron, as determined by optical microscopy. The solvent-monomer-initiator emulsion thus formed was then combined with 500 grams of the fragmentation domain latex from Example 1.1 to form an emulsion-latex mixture. The magnesium sulfate solution kettle charge was stirred at 500 RPM at 25° C., while the emulsion-latex mixture was added during 5 minutes. In the presence of magnesium sulfate, the fragmentation domain latex and emulsified monomer-solvent-initiator emulsion co-coagulated into a slurry-like mixture. The resulting slurry mixture was heated to a temperature of 85° C. and held for 120 minutes to cause the monomer to polymerize. The reaction mixture was cooled to 25° C., and filtered through a fritted stainless steel funnel with a pore size of less than about 1 micron. The filtrate was clear. The precision fragmentation assemblage particles were washed with 5,000 grams of deionized water. The filter cake was dried in a vacuum oven at 60° C. and 0.1 atmospheres for two days. The weight of PFA product was 162 grams (96% of the theoretical total). The powdery PFA sample was examined by scanning electron microscopy and found to have a particle size of about 1-20 microns (polydispersity of PSD -2). The individual particles were porous.

Eample 3.2

Preparation of a Precision Fragmentation Assemblage by Spheroid Coagulation Followed by Polymerization Intially, 497.5 grams of water and 2.5 grams of anhydrous magnesium sulfate are added to a 3 liter beaker fitted with a paddle stirrer, thermometer, nitrogen sparge, and heating mantel. A solvent-monomer-initiator solution is prepared by mixing, in a 100 ml beaker, 19 grams of styrene, 5 grams of divinyl benzene, 48 grams of xylene, and 0.5 grams of t-butyl peroctoate. The solvent-monomer-initiator solution (72.5 grams) is then added to a 150 ml beaker, along with 3 grams of sodium lauryl sulfate (28% solution in water) and 25 grams of water, and emulsified using a high speed ultrasonic mixer. The droplet size of the organic phase is less than about 1 micron, as determined by optical microscopy. The solvent-monomer-initiator emulsion thus formed is then combined with 500 grams of the fragmentation domain latex to form an emulsion-latex mixture (fragmentation domain latexes 1.2.A through 1.2.I are used herein to prepare PFAs 3.2.A through 3.2.I, respectively). The magnesium sulfate solution kettle charge is stirred at 500 RPM at 65° C. while the emulsion-latex mixture is added during 1 minute. In the presence of magnesium sulfate, the fragmentation domain latex and emulsified monomer-solvent-initiator emulsion co-coagulate into a slurry-like mixture in which the bulk particles formed are spheroidal in shape and display a narrow particle size distribution. The resulting slurry mixture is heated to a temperature of 85° C. and held for 120 minutes to cause the monomer to polymerize. The reaction mixture is cooled to 25° C., and filtered through a fritted stainless steel funnel with a pore size of less than about 1 micron. The filtrate should be clear. The precision fragmentation assemblage particles (PFA particles) are washed with 5,000 grams of deionized water. The filter cake is dried in a vacuum oven at 60° C. and 0.1 atmospheres for two days. The weight of PFA product is 162 grams (96% of the theoretical total). The PFA particles have an average particle size of 50 microns and a polydispersity of the particle size distribution of 1.3. PFA characteristics, including ethylene polymerization efficiency of PFA catalysts prepared from them by experimental methods given infra, are given in Table 3.2.

TABLE 3.2

Characteristics of variously functionalized PFA particles having fragmentation domains with average particle size of 150 nanometers.

| PFA Number | mmoles residual double bonds/ g PFA | mmoles OH groups/ g PFA | mmoles epoxy groups/ g PFA | Pore volume of PFA, cc/g | surface area of PFA, m²/g | metal complex | activator | grams polyolefin/ gram PFA | polyolefin ave. P.S., mm |
|---|---|---|---|---|---|---|---|---|---|
| 3.2.A | 0.17 | 0.86 | 0.00 | 0.33 | 45 | BBCZC[a] | MAO | 21,780[d] | 1.40 |
| 3.2.B | 0.19 | 1.09 | 0.00 | 0.33 | 45 | BBCZC | MAO | 24,572 | 1.45 |
| 3.2.C | 0.17 | 0.00 | 0.86 | 0.33 | 45 | BBCZC | MAO | 15,593 | 1.25 |
| 3.2.D | 0.17 | 0.00 | 1.72 | 0.33 | 45 | BBCZC | MAO | 21,632 | 1.39 |
| 3.2.E | 0.46 | 0.86 | 0.00 | 0.33 | 45 | BBCZC | MAO | 17,443 | 1.30 |
| 3.2.F | 0.46 | 1.72 | 0.00 | 0.33 | 45 | BBCZC | MAO | 24,198 | 1.45 |
| 3.2.G | 2.05 | 0.00 | 0.00 | 0.33 | 45 | (b) | (b) | 23,010 | 1.42 |
| 3.2.H | 0.17 | 0.00 | 0.00 | 0.33 | 45 | (c) | (c) | 11,239 | 1.12 |
| 3.2.I | 0.07 | 0.00 | 0.00 | 0.33 | 45 | (b) | (b) | 10,810 | 1.11 |

[a]BBCZC is the metal complex $(BuCp)_2ZrCl_2$;
(b) PFA catalyst is prepared using the method of example H.1 wherein the catalytic component is biscyclopentadienyl zirconium dimethyl and the activator component is N,N-dimethylanilinium tetra(pentafluorophenyl)borate;
(c) PFA catalyst is prepared using the method of example H.2 wherein the catalytic component and activator component are prepared from the reaction of magnesium ethoxylate with an excess of titanium tetrachloride;
[d]efficiencies and polyolefin particle sizes are in all cases evaluated using the method of example J.

Example 3.3

Preparation of a Precision Fragmentation Assemblage by Spheroid Coagulation Followed by Polymerization The procedure of Example 3.2 is followed in this example to prepare the PFAs for which characteristics are listed in Table 3.3. PFA samples 3.3.A through 3.3.I are prepared by the 65° C. coagulation of fragmentation domain latexes 1.3.A through 1.3.I, respectively, along with solvent, monomer, and initiator. The PFA particles have an average particle size of 50 microns and a polydispersity of the particle size distribution of 1.3. PFA characteristics, including ethylene polymerization efficiency of PFA catalysts prepared from them by experimental methods given infra, are given in Table 3.3.

TABLE 3.3

Characteristics of variously functionalized PFA particles having fragmentation domains with average particle size of 600 nanometers.

| PFA Number | mmoles residual double bonds/g PFA | mmoles OH groups/ g PFA | mmoles epoxy groups/ g PFA | Pore volume of PFA, cc/g | surface area of PFA, m²/g | metal complex | activator | grams polyolefin/ gram PFA | polyolefin average P.S., mm |
|---|---|---|---|---|---|---|---|---|---|
| 3.3.A | 0.17 | 0.86 | 0.00 | 0.33 | 22 | BBCZC[a] | MAO | 9,585[d] | 1.06 |
| 3.3.B | 0.19 | 1.09 | 0.00 | 0.33 | 22 | BBCZC | MAO | 10,556 | 1.10 |
| 3.3.C | 0.17 | 0.00 | 0.86 | 0.33 | 22 | BBCZC | MAO | 9,585 | 1.06 |
| 3.3.D | 0.17 | 0.00 | 1.72 | 0.33 | 22 | BBCZC | MAO | 13,298 | 1.18 |
| 3.3.E | 0.46 | 0.86 | 0.00 | 0.33 | 22 | BBCZC | MAO | 10,722 | 1.10 |
| 3.3.F | 0.46 | 1.72 | 0.00 | 0.33 | 22 | BBCZC | MAO | 14,875 | 1.23 |
| 3.3.G | 2.05 | 0.00 | 0.00 | 0.33 | 22 | (b) | (b) | 14,145 | 1.21 |
| 3.3.H | 0.17 | 0.00 | 0.00 | 0.33 | 22 | (c) | (c) | 6,909 | 0.95 |
| 3.3.I | 0.07 | 0.00 | 0.00 | 0.33 | 22 | (b) | (b) | 6,645 | 0.94 |

[a]BBCZC is the metal complex (BuCp)2ZrCl2;
(b) PFA catalyst is prepared using the method of example H.1 wherein the catalytic component is biscyclopentadienyl zirconium dimethyl and the activator component is N,N-dimethylanilinium tetra(pentafluorophenyl)borate;
(c) PFA catalyst is prepared using the method of example H.2 wherein the catalytic component and activator component are prepared from the reaction of magnesium ethoxylate with an excess of titanium tetrachloride;
[d]efficiencies and polyolefin particle sizes are in all cases evaluated using the method of example J.

Example 3.4

Preparation of PFAs. Variations in: Amount of Fragmentation Zone, Fragmentation Domain Latex, Second Polymer, Crosslinking Monomer in Second Polymer, and PNP; and Tg of Second Polymer The Precision Fragmentation Assemblages of this example are prepared according to the procedure of Example 3.2, except that the solvent-monomer-initiator solution was prepared as follows: A solvent-monomer-initiator solution is prepared by mixing, in a 100 ml beaker, monomer 1, monomer 2, monomer 3 (Table 3.4.d only), PNP solution, xylene, and 0.5 grams of t-butyl peroctoate (see Tables 3.4.a, b, and d for quantities). The fragmentation domain latex is that of Example 1.1 for Examples 3.4.A and 3.4.B. The fragmentation domain latex is as indicated in Table 3.4.d for Examples 3.4.D. The fragmentation domain latex is added to the magnesium sulfate solution maintained at 65° C. in all cases. The PFA particles have an average particle size of 50 microns and a polydispersity of the particle size distribution of 1.3. PFA characteristics, including ethylene polymerization efficiency of PFA catalysts prepared from them by experimental methods given infra, are given in Table 3.4. a.1.

TABLE 3.4.a

Monomer, solvent and PNP solution charges for Example 3.4.A.

| Example Number | Frag. domain latex weight, grams | Mon. 1, Styrene weight, grams | Mon. 2, DVB weight, grams | Xylene weight, grams | PNP[a] solution weight, grams | PNP solution wt % PNP | Xylene in PNP solution, grams | Total weight of xylene, grams |
|---|---|---|---|---|---|---|---|---|
| 3.4.A.1 | 498.9 | 19.08 | 5.02 | 48.22 | | | | 48.22 |
| 3.4.A.2 | 498.9 | 5.73 | 1.51 | 65.09 | | | | 65.09 |
| 3.4.A.3 | 498.9 | 1.15 | 0.30 | 70.88 | | | | 70.88 |
| 3.4.A.4 | 374.1 | 28.63 | 7.53 | 72.34 | | | | 72.34 |
| 3.4.A.5 | 374.1 | 8.59 | 2.26 | 97.65 | | | | 97.65 |
| 3.4.A.6 | 374.1 | 1.72 | 0.45 | 106.33 | | | | 106.33 |
| 3.4.A.7 | 498.88 | 22.90 | 1.21 | 48.22 | | | | 48.22 |
| 3.4.A.8 | 498.88 | 23.62 | 0.48 | 48.22 | | | | 48.22 |
| 3.4.A.9 | 498.88 | 23.99 | 0.12 | 48.22 | | | | 48.22 |
| 3.4.A.10 | 498.88 | 19.04 | 5.06 | 12.06 | 36.16 | 20 | 28.93 | 40.99 |
| 3.4.A.11 | 498.88 | 19.04 | 5.06 | 12.06 | 36.17 | 40 | 21.70 | 33.76 |
| 3.4.A.12 | 498.88 | 11.43 | 3.04 | 21.70 | 36.16 | 20 | 28.93 | 50.63 |
| 3.4.A.13 | 498.88 | 11.43 | 3.04 | 21.70 | 36.17 | 40 | 21.70 | 43.4 |

[a]PNP is 2.A with composition Sty/DVB = 80/20 (weight basis).

TABLE 3.4.a.1

Characteristics PFA particles varying in fragmentation zone size, amount, and crosslinking of second polymer, and PNP content wherein the second polymer has a Tg greater than room temperature.

| PFA Number | mmoles residual double bonds/g PFA | mmoles OH groups/ g PFA | mmoles epoxy groups/ g PFA | Pore volume of PFA, cc/g | surface area of PFA, m²/g | metal complex | activator | grams polyolefin/ gram PFA | polyolefin average P.S., mm |
|---|---|---|---|---|---|---|---|---|---|
| 3.4.A.1 | 0.46 | 0.00 | 0.00 | 0.34 | 46 | (a) | (a) | 12,607[c] | 1.16 |
| 3.4.A.2 | 0.46 | 0.00 | 0.00 | 0.50 | 40 | (b) | (b) | 11,290 | 1.12 |
| 3.4.A.3 | 0.46 | 0.00 | 0.00 | 0.56 | 37 | (a) | (a) | 10,603 | 1.10 |
| 3.4.A.4 | 0.47 | 0.00 | 0.00 | 0.58 | 60 | (a) | (a) | 16,969 | 1.28 |
| 3.4.A.5 | 0.46 | 0.00 | 0.00 | 0.95 | 54 | (b) | (b) | 15,095 | 1.24 |
| 3.4.A.6 | 0.46 | 0.00 | 0.00 | 1.12 | 43 | (a) | (a) | 11,876 | 1.14 |
| 3.4.A.7 | 0.41 | 0.00 | 0.00 | 0.33 | 45 | (a) | (a) | 12,345 | 1.16 |
| 3.4.A.8 | 0.40 | 0.00 | 0.00 | 0.33 | 45 | (b) | (b) | 12,298 | 1.15 |
| 3.4.A.9 | 0.40 | 0.00 | 0.00 | 0.33 | 45 | (a) | (a) | 12,275 | 1.15 |
| 3.4.A.10 | 0.46 | 0.00 | 0.00 | 0.27 | 80 | (b) | (b) | 21,608 | 1.39 |
| 3.4.A.11 | 0.46 | 0.00 | 0.00 | 0.21 | 112 | (b) | (b) | 26,141 | 1.48 |
| 3.4.A.12 | 0.46 | 0.00 | 0.00 | 0.35 | 80 | (b) | (b) | 20,529 | 1.37 |
| 3.4.A.13 | 0.46 | 0.00 | 0.00 | 0.29 | 114 | (b) | (b) | 25,254 | 1.47 |

(a) PFA catalyst is prepared using the method of example H.1 wherein the catalytic component is biscyclopentadienyl zirconium dimethyl and the activator component is N,N-dimethylanilinium tetra(pentafluorophenyl)borate;
(b) PFA catalyst is prepared using the method of example H.2 wherein the catalytic component and activator component are prepared from the reaction of magnesium ethoxylate with an excess of titanium tetrachloride;
[c]efficiencies and polyolefin particle sizes are in all cases evaluated using the method of example J.

TABLE 3.4.b

Monomer, solvent and PNP solution charges for Example 3.4.B.

| Example Number | Frag. domain latex weight, grams | Mon. 1 Butyl acrylate weight, grams | Mon. 2, ALMA weight, grams | Xylene weight, grams | PNP[a] solution weight, grams | PNP solution wt % PNP | Xylene in PNP solution, grams | Total weight of xylene, grams |
|---|---|---|---|---|---|---|---|---|
| 3.4.B.1 | 498.9 | 22.90 | 1.21 | 48.22 | | | | 48.22 |
| 3.4.B.2 | 498.9 | 6.88 | 0.36 | 65.09 | | | | 65.09 |
| 3.4.B.3 | 498.9 | 1.38 | 0.07 | 70.88 | | | | 70.88 |
| 3.4.B.4 | 498.9 | 68.71 | 3.62 | 0.00 | | | | 0.00 |
| 3.4.B.5 | 374.1 | 34.35 | 1.81 | 72.34 | | | | 72.34 |
| 3.4.B.6 | 374.1 | 10.31 | 0.54 | 97.65 | | | | 97.65 |
| 3.4.B.7 | 374.1 | 2.06 | 0.11 | 106.33 | | | | 106.33 |
| 3.4.B.8 | 374.1 | 103.08 | 5.43 | 0.00 | | | | 0.00 |
| 3.4.B.9 | 498.88 | 22.90 | 1.21 | 48.22 | | | | 48.22 |
| 3.4.B.10 | 498.88 | 22.90 | 1.21 | 48.22 | | | | 48.22 |
| 3.4.B.11 | 498.88 | 22.90 | 1.21 | 48.22 | | | | 48.22 |
| 3.4.B.12 | 498.88 | 22.90 | 1.21 | 12.06 | 36.16 | 20 | 28.93 | 40.99 |
| 3.4.B.13 | 498.88 | 22.90 | 1.21 | 12.06 | 36.17 | 40 | 21.70 | 33.76 |
| 3.4.B.14 | 498.88 | 13.75 | 0.72 | 21.70 | 36.16 | 20 | 28.93 | 50.63 |
| 3.4.B.15 | 498.88 | 13.75 | 0.72 | 21.70 | 36.17 | 40 | 21.70 | 43.4 |

[a]PNP is 2.C with composition MMA/ALMA = 95/5 (weight basis).

TABLE 3.4.b.1

Characteristics of PFA particles varying in fragmentation zone size, amount, and crosslinking of second polymer, and PNP content wherein the second polymer has a Tg below room temperature.

| PFA Number | mmoles residual double bonds/g PFA | mmoles OH groups/ g PFA | mmoles epoxy groups/ g PFA | Pore volume of PFA, cc/g | surface area of PFA, $m^2/g$ | metal complex | activator | grams polyolefin/ gram PFA | polyolefin average P.S., mm |
|---|---|---|---|---|---|---|---|---|---|
| 3.4.B.1 | 0.41 | 0.00 | 0.00 | 0.33 | 45 | (b) | (b) | 12,348[c] | 1.16 |
| 3.4.B.2 | 0.45 | 0.00 | 0.00 | 0.50 | 40 | (a) | (a) | 11,215 | 1.12 |
| 3.4.B.3 | 0.46 | 0.00 | 0.00 | 0.56 | 37 | (b) | (b) | 10,588 | 1.10 |
| 3.4.B.4 | 0.35 | 0.00 | 0.00 | 0.00 | 50 | (a) | (a) | 13,186 | 1.18 |
| 3.4.B.5 | 0.38 | 0.00 | 0.00 | 0.58 | 60 | (b) | (b) | 16,394 | 1.27 |
| 3.4.B.6 | 0.43 | 0.00 | 0.00 | 0.95 | 54 | (a) | (a) | 14,907 | 1.23 |
| 3.4.B.7 | 0.45 | 0.00 | 0.00 | 1.12 | 43 | (b) | (b) | 11,844 | 1.14 |
| 3.4.B.8 | 0.29 | 0.00 | 0.00 | 0.00 | 57 | (b) | (b) | 14,845 | 1.23 |
| 3.4.B.9 | 0.41 | 0.00 | 0.00 | 0.33 | 45 | (b) | (b) | 12,348 | 1.16 |
| 3.4.B.10 | 0.41 | 0.00 | 0.00 | 0.33 | 45 | (b) | (b) | 12,348 | 1.16 |
| 3.4.B.11 | 0.41 | 0.00 | 0.00 | 0.33 | 45 | (a) | (a) | 12,348 | 1.16 |
| 3.4.B.12 | 0.41 | 0.00 | 0.00 | 0.27 | 80 | (b) | (b) | 21,184 | 1.38 |
| 3.4.B.13 | 0.41 | 0.00 | 0.00 | 0.21 | 112 | (b) | (b) | 25,630 | 1.47 |
| 3.4.B.14 | 0.43 | 0.00 | 0.00 | 0.35 | 80 | (b) | (b) | 20,270 | 1.36 |
| 3.4.B.15 | 0.43 | 0.00 | 0.00 | 0.29 | 114 | (b) | (b) | 24,936 | 1.46 |

(a) PFA catalyst is prepared using the method of example H.1 wherein the catalytic component is biscyclopentadienyl zirconium dimethyl and the activator component is N,N-dimethylanilinium tetra(pentafluorophenyl)borate;
(b) PFA catalyst is prepared using the method of example H.2 wherein the catalytic component and activator component are prepared from the reaction of magnesium ethoxylate with an excess of titanium tetrachloride;
[c]efficiencies and polyolefin particle sizes are in all cases evaluated using the method of example J.

TABLE 3.4.d

PFAs having variations in functionalization of fragmentation domain, second polymer, and PNP.

| Example Number | Mon. 1, weight, grams | Mon. 2, weight, grams | Mon. 3, weight, grams | Xylene weight, grams | PNP solution weight, grams | PNP solution wt % PNP | Xylene in PNP solution, grams | Total weight of xylene, grams |
|---|---|---|---|---|---|---|---|---|
| | styrene | VBA | DVB | | | | | |
| 3.4.D.1 | 6.96 | 1.63 | 2.26 | 97.65 | | | | 97.65 |
| 3.4.D.2 | 6.96 | 1.63 | 2.26 | 61.48 | 36.17[a] | 40 | 21.70 | 83.18 |
| 3.4.D.3 | 6.96 | 1.63 | 2.26 | 61.48 | 36.17[b] | 40 | 21.70 | 83.18 |
| | BA | HEMA | ALMA | | | | | |
| 3.4.D.4 | 8.86 | 1.63 | 0.54 | 97.65 | | | | 97.65 |

TABLE 3.4.d-continued

PFAs having variations in functionalization of fragmentation domain, second polymer, and PNP.

| Example Number | Mon. 1, weight, grams | Mon. 2, weight, grams | Mon. 3, weight, grams | Xylene weight, grams | PNP solution weight, grams | PNP solution wt % PNP | Xylene in PNP solution, grams | Total weight of xylene, grams |
|---|---|---|---|---|---|---|---|---|
| 3.4.D.5 | 8.86 | 1.63 | 0.54 | 61.48 | 36.17$^c$ | 40 | 21.70 | 83.18 |
| 3.4.D.6 | 8.86 | 1.63 | 0.54 | 61.48 | 36.17$^d$ | 40 | 21.70 | 83.18 |
|  | styrene |  | DVB |  |  |  |  |  |
| 3.4.D.7 | 8.59 |  | 2.26 | 61.48 | 36.17$^a$ | 40 | 21.70 | 83.18 |
| 3.4.D.8 | 8.59 |  | 2.26 | 61.48 | 36.17$^b$ | 40 | 21.70 | 83.18 |
|  | BA |  | ALMA |  |  |  |  |  |
| 3.4.D.9 | 10.31 |  | 0.54 | 61.48 | 36.17$^c$ | 40 | 21.70 | 83.18 |
| 3.4.D.10 | 10.31 |  | 0.54 | 61.48 | 36.17$^d$ | 40 | 21.70 | 83.18 |
|  | styrene | VBA | DVB |  |  |  |  |  |
| 3.4.D.11 | 6.96 | 1.63 | 2.26 | 97.65 |  |  |  | 97.65 |
| 3.4.D.12 | 6.96 | 1.63 | 2.26 | 61.48 | 36.17$^a$ | 40 | 21.70 | 83.18 |
| 3.4.D.13 | 6.96 | 1.63 | 2.26 | 61.48 | 36.17$^b$ | 40 | 21.70 | 83.18 |
|  | BA | HEMA | ALMA |  |  |  |  |  |
| 3.4.D.14 | 8.86 | 1.63 | 0.54 | 97.65 |  |  |  | 97.65 |
| 3.4.D.15 | 8.86 | 1.63 | 0.54 | 61.48 | 36.17$^c$ | 40 | 21.70 | 83.18 |
| 3.4.D.16 | 8.86 | 1.63 | 0.54 | 61.48 | 36.17$^d$ | 40 | 21.70 | 83.18 |

The fragmentation domain latex:
for examples 3.4.D.1-3.4.D.10 is the fragmentation latex of Example 1.1, weight = 374.1 grams;
for examples 3.4.D.11-3.4.D.13 is Example 1.2.E, weight = 374.1 grams; and
for examples 3.4.D.14-3.4.D.16 is Example 1.2.A, weight = 374.1 grams.
$^a$PNP is example 2.A, 80 wt % styrene and 20 wt % DVB, based on the weight of the PNP;
$^b$PNP is example 2.B, 65 wt % styrene, 15 wt % AOH, and 20 wt % DVB;
$^c$PNP is example 2.C, 95 wt % MMA and 5 wt % ALMA;
$^d$PNP is example 2.D, 80 wt % MMA, 15 wt % HEMA, and 5 wt % ALMA.

TABLE 3.4.d.1

Characteristics of PFA particles varying in fragmentation zone size, amount, and crosslinking of second polymer, and PNP content wherein the second polymer has a Tg below room temperature.

| PFA Number | mmoles residual double bonds/g PFA | mmoles OH groups/ g PFA | mmoles epoxy groups/ g PFA | Pore volume of PFA, cc/g | surface area of PFA, m$^2$/g | metal complex | activator | grams poly-olefin/ gram PFA | poly-olefin average P.S., mm |
|---|---|---|---|---|---|---|---|---|---|
| 3.4.D.1 | 0.46 | 0.10 | 0.00 | 0.95 | 54 | BBCZC$^a$ | MAO | 15,694$^d$ | 1.25 |
| 3.4.D.2 | 0.46 | 0.09 | 0.00 | 0.76 | 97 | BBCZC | MAO | 26,757 | 1.50 |
| 3.4.D.3 | 0.46 | 0.21 | 0.00 | 0.76 | 97 | BBCZC | MAO | 28,021 | 1.52 |
| 3.4.D.4 | 0.43 | 0.10 | 0.00 | 0.95 | 54 | BBCZC | MAO | 15,577 | 1.25 |
| 3.4.D.5 | 0.40 | 0.09 | 0.00 | 0.76 | 97 | BBCZC | MAO | 26,203 | 1.49 |
| 3.4.D.6 | 0.40 | 0.22 | 0.00 | 0.76 | 97 | BBCZC | MAO | 27,479 | 1.51 |
| 3.4.D.7 | 0.46 | 0.00 | 0.00 | 0.76 | 97 | (c) | (c) | 25,845 | 1.48 |
| 3.4.D.8 | 0.46 | 0.12 | 0.00 | 0.76 | 97 | BBCZC | MAO | 27,066 | 1.50 |
| 3.4.D.9 | 0.40 | 0.00 | 0.00 | 0.76 | 97 | (b) | (b) | 25,198 | 1.47 |
| 3.4.D.10 | 0.40 | 0.12 | 0.00 | 0.76 | 97 | BBCZC | MAO | 26,426 | 1.49 |
| 3.4.D.11 | 0.46 | 1.01 | 0.00 | 0.95 | 54 | BBCZC | MAO | 22,200 | 1.41 |
| 3.4.D.12 | 0.46 | 0.90 | 0.00 | 0.76 | 97 | BBCZC | MAO | 36,457 | 1.66 |
| 3.4.D.13 | 0.46 | 1.02 | 0.00 | 0.76 | 97 | BBCZC | MAO | 38,180 | 1.68 |
| 3.4.D.14 | 0.12 | 1.01 | 0.00 | 0.95 | 54 | BBCZC | MAO | 19,561 | 1.35 |
| 3.4.D.15 | 0.12 | 0.90 | 0.00 | 0.76 | 97 | BBCZC | MAO | 32,105 | 1.59 |
| 3.4.D.16 | 0.12 | 1.03 | 0.00 | 0.76 | 97 | BBCZC | MAO | 33,668 | 1.61 |

$^a$BBCZC is the metal complex (BuCp)2ZrCl2;
(b) PFA catalyst is prepared using the method of example H.1 wherein the catalytic component is biscyclopentadienyl zirconium dimethyl and the activator component is N,N-dimethylanilinium tetra(pentafluorophenyl)borate;
(c) PFA catalyst is prepared using the method of example H.2 wherein the catalytic component and activator component are prepared from the reaction of magnesium ethoxylate with an excess of titanium tetrachloride;
$^d$efficiencies and polyolefin particle sizes are in all cases evaluated using the method of example J.

Example 4.1

Epoxidation of Vinyl Bearing PFAs using m-chloroperbenzoic acid (MCPBA).

A 500 ml narrow mouth glass bottle is charged with 5.0 grams of PFA particles (screened to provide particles having diameters between 38 μm and 45 μm), and 150 grams of 1,2-dichloroethane. The bottle is placed on a laboratory shaker and agitated gently for 1 hour. The bottle is then removed and placed in an ice bath for 30 minutes. A solution is prepared consisting of 20 ml of 1,2-dichloroethane and m-chloroperoxybenzoic acid (nominal 75% active) in one of the amounts given in grams reagent per gram of PFA, shown in Table 4.1.a, depending upon the desired number of mmoles of MCPBA per mmole of vinyl group. This solution is rapidly added to a cold reaction bottle, and the bottle is placed on the shaker and agitated gently for 20 hours. During this time the temperature of the reaction mixture rises to 30° C., primarily due to the heat generated by the mechanism of the shaker.

The reaction mixture is poured into a 125 ml glass filter column equipped with a fine porosity filter disk. The reaction solvent is removed under vacuum, and the solid resin is mixed with 100 ml of 1,2-dichloroethane, followed by removal under vacuum. This process is repeated with two additional 100 ml portions of 1,2-dichloroethane. The wash process is then repeated with three portions of inhibitor free tetrahydrofuran. The solid resin is then dried in the column under a flow of nitrogen, followed by drying at room temperature under vacuum.

TABLE 4.1.a

MCPBA use level based on total moles of DVB present in PFA as polymerized units.

| Epoxy PFA Example number | PFA Example number | mmole vinyl groups/ gram PFA | Grams of MCPBA added/ gram PFA |
|---|---|---|---|
| 4.1.A.1 | 3.1 | 0.45 | 0.085 |
| 4.1.A.2 | 3.1 | 0.45 | 0.057 |
| 4.1.A.3 | 3.2.H | 2.04 | 0.032 |
| 4.1.A.4 | 3.3.G | 2.04 | 0.377 |
| 4.1.A.5 | 3.3.H | 2.04 | 0.032 |
| 4.1.A.6 | 3.4.A1 | 0.46 | 0.014 |
| 4.1.A.7 | 3.4.A2 | 0.46 | 0.085 |
| 4.1.A.8 | 3.4.A3 | 0.46 | 0.085 |
| 4.1.A.9 | 3.4.A4 | 0.46 | 0.085 |
| 4.1.A.10 | 3.4.A5 | 0.46 | 0.085 |
| 4.1.A.11 | 3.4.A6 | 0.46 | 0.113 |
| 4.1.A.12 | 3.4.A7 | 0.46 | 0.076 |
| 4.1.A.13 | 3.4.A8 | 0.46 | 0.018 |
| 4.1.A.14 | 3.4.A9 | 0.46 | 0.074 |
| 4.1.A.15 | 3.4.A10 | 0.46 | 0.085 |
| 4.1.A.16 | 3.4.A11 | 0.46 | 0.085 |
| 4.1.A.17 | 3.4.A12 | 0.46 | 0.085 |
| 4.1.A.18 | 3.4.A13 | 0.46 | 0.085 |
| 4.1.A.19 | 3.4.D.7 | 0.46 | 0.085 |
| 4.1.A.20 | 3.4.D.8 | 0.46 | 0.085 |
| 4.1.A.21 | 3.1 | 0.45 | 0.114 |

TABLE 4.1.a.1

Characteristics of PFA particles functionalized by epoxidation of the double bond bearing PFAs particles

| PFA Number | mmoles residual double bonds/g PFA | mmoles OH groups/ g PFA | mmoles epoxy groups/ g PFA | Pore volume of PFA, cc/g | surface area of PFA, $m^2/g$ | metal complex | activator | grams poly-olefin/ gram PFA | poly-olefin average P.S., mm |
|---|---|---|---|---|---|---|---|---|---|
| 4.1.A.1 | 0.46 | 0.00 | 0.37 | 0.33 | 45 | BBCZC[a] | MAO | 14,487[b] | 0.37 |
| 4.1.A.2 | 0.45 | 0.00 | 0.25 | 0.33 | 45 | BBCZC | MAO | 13,805 | 0.36 |
| 4.1.A.3 | 0.17 | 0.00 | 0.14 | 0.33 | 45 | BBCZC | MAO | 11,840 | 0.34 |
| 4.1.A.4 | 2.05 | 0.00 | 1.64 | 0.33 | 22 | BBCZC | MAO | 14,874 | 0.37 |
| 4.1.A.5 | 0.17 | 0.00 | 0.14 | 0.33 | 22 | BBCZC | MAO | 7,278 | 0.29 |
| 4.1.A.6 | 0.46 | 0.00 | 0.06 | 0.34 | 46 | BBCZC | MAO | 12,914 | 1.17 |
| 4.1.A.7 | 0.46 | 0.00 | 0.37 | 0.50 | 40 | BBCZC | MAO | 13,001 | 1.18 |
| 4.1.A.8 | 0.46 | 0.00 | 0.37 | 0.56 | 37 | BBCZC | MAO | 12,208 | 1.15 |
| 4.1.A.9 | 0.47 | 0.00 | 0.37 | 0.58 | 60 | BBCZC | MAO | 19,564 | 1.35 |
| 4.1.A.10 | 0.46 | 0.00 | 0.37 | 0.95 | 54 | BBCZC | MAO | 17,388 | 1.30 |
| 4.1.A.11 | 0.46 | 0.00 | 0.43 | 1.12 | 43 | BBCZC | MAO | 14,325 | 1.21 |
| 4.1.A.12 | 0.41 | 0.00 | 0.33 | 0.33 | 45 | BBCZC | MAO | 14,001 | 1.21 |
| 4.1.A.13 | 0.40 | 0.00 | 0.08 | 0.33 | 45 | BBCZC | MAO | 12,681 | 1.17 |
| 4.1.A.14 | 0.40 | 0.00 | 0.32 | 0.33 | 45 | BBCZC | MAO | 13,858 | 1.20 |
| 4.1.A.15 | 0.46 | 0.00 | 0.37 | 0.27 | 80 | BBCZC | MAO | 24,900 | 1.46 |
| 4.1.A.16 | 0.46 | 0.00 | 0.37 | 0.21 | 112 | BBCZC | MAO | 30,124 | 1.56 |
| 4.1.A.17 | 0.46 | 0.00 | 0.37 | 0.35 | 80 | BBCZC | MAO | 23,649 | 1.44 |
| 4.1.A.18 | 0.46 | 0.00 | 0.37 | 0.29 | 114 | BBCZC | MAO | 29,091 | 1.54 |
| 4.1.A.19 | 0.46 | 0.00 | 0.37 | 0.76 | 97 | BBCZC | MAO | 29,769 | 1.55 |
| 4.1.A.20 | 0.46 | 0.00 | 0.37 | 0.76 | 97 | BBCZC | MAO | 29,769 | 1.55 |
| 4.1.A.21 | 0.45 | 0.00 | 0.44 | 0.33 | 45 | BBCZC | MAO | 15,252 | 1.23 |

[a]BBCZC is the metal complex $(BuCp)_2ZrCl_2$;
[b]efficiencies and polyolefin particle sizes are in all cases evaluated using the method of example J.

Example G

Preparation of a Stock Solution of Catalytic Component (BuCp)$_2$ZrCl$_2$ and Activator Component methylaluminoxane (MAO) in Toluene The manipulations of this example were carried out in a glovebox under dry Argon atmosphere. (BuCp)$_2$ZrCl$_2$ (~9.5mg) was placed in a 20 ml vial, followed by addition of 3.2 mls of 10% MAO solution in toluene. After 15 minutes, the solution turned a pale yellow-orange color.

Example H

Standard Preparation of PFA Catalyst from a PFA

This procedure was used to prepare the PFA catalysts. The manipulations of this example are carried out in a glovebox under dry Argon atmosphere. The (100 mg) and 2 mls of toluene are charged to a 20 ml vial to form a slurry. While shaking the slurry, 270 µl of (BuCp)$_2$ZrCl$_2$/MAO stock solution (~20 µmole Zr/g of epoxidized resin) is add to the slurry. After approximately 20 minutes, the PFA particles becomes yellow-orange while the solution becomes clear, indicating that the (BuCp)$_2$ZrCl$_2$/MAO is absorbed into the PFA. After 30 minutes, the toluene is removed under reduced pressure during approximately one hour to yield a pale yellow powder. The powder (60 mgs) is then suspended in 300 mls of heptane in a 600 ml Parr bomb sleeve. The sleeve is then sealed inside the Parr bomb which is pressurized to ~40 psig with Argon. The Parr bomb is then removed from the glovebox and attached to the ethylene system in preparation for an ethylene polymerization.

Example H.1

Preparation of a PFA Catalyst Containing biscyclopentadienyl zirconium dimethyl as Catalytic Component and N,N-dimethylanilinium tetra(pentafluorophenyl)borate as Activator Component An example illustrating preparation of a PFA catalyst comprising a specific Group 4 catalyst of the present invention useful for the polymerization and copolymerization of ethylene. All manipulations are performed in a glove box under a dry and inert, argon atmosphere.

To 0.500 g of the PFA is added 5 ml of toluene. This PFA is allowed to imbibe toluene for 30 minutes. Next, a dark orange oil produced from the reaction of 0.053 g of biscyclopentadienyl zirconium dimethyl in 2 ml of toluene with 0.145 g of N,N-dimethylanilinium tetra(pentafluorophenyl)borate is added to the toluene swollen PFA. The oil quickly reacts with the material resulting in a light orange product and a colorless toluene solution. After mixing for 45 minutes, the material is filtered and washed with 10 ml of toluene followed by 2×20 ml of dry oxygen free heptane. A beige product resulted from filtration and is dried under vacuum, yielding 0.580 g of catalyst. This product contains a calculated 0.27 mmol of Zr per gram of PFA catalyst.

Example H.2

Preparation of a PFA Catalyst Containing Ziegler-Natta Catalyst and Activator Components An example illustrating preparation of a PFA catalyst containing Ziegler-Natta Catalyst and Activator components. All manipulations are performed in a glove box under a dry and inert, argon atmosphere. To 0.500 g of the PFA is added 5 ml of chlorobenzene. This PFA is allowed to imbibe chlorobenzene for 30 minutes, after which a solution of magnesium ethoxylate (0.11 g, 1.0 mmole) in 2 ml chlorobenzene is added. The mixture is stirred for 30 minutes, and then the chlorobenzene that is not within the PFA is removed under vacuum. A solution of titanium chloride (0.21g, 1.1 mmole) in 5 ml chlorobenzene is then added to the PFA/Mg(OEt)$_2$. After mixing for 45 minutes, the material is filtered and washed with 10 ml of toluene followed by 2×20 ml of dry oxygen free heptane. The PFA catalyst is dried under vacuum, yielding 0.580 g of catalyst. This product contains a calculated 0.22 mmol of Ti per gram of PFA catalyst.

Example J

Standard Ethylene Polymerization Procedure for Evaluating PFA Catalysts in a 600 ml Parr Reactor This procedure is used in all of the olefin polymerization examples described herein below. A 600 ml Parr reactor, including its inner glass sleeve, is dried overnight in an oven at ~110° C., and then placed in a glovebox having an atmosphere of dry Argon. A pre-weighed quantity of PFA catalyst, (typically ~60 mg) is charged to the reactor sleeve, and then 300 ml of dry, oxygen-free heptane is added to the sleeve as a diluent. The reactor is assembled and sealed, pressurized to 40 psig with Argon, and then removed from the dry box. The reactor is then placed in a pre-heated heating mantle and connected to an ethylene feed line by means of a Swagelok quick-connect fitting. The connection is immediately pressure purged ten times to 85 psig with ethylene. The stirring shaft is then connected to the drive and stirring is commenced at about 200 rpm. While the reactor is warming to the target polymerization temperature, the water supply and discharge lines are connected to the cooling coil. Once the reactor is at the target polymerization temperature, the Argon pressure is vented through the ethylene connection through a 3-way valve with a check-protected vent. The reactor is then pressurized to 85 psig with ethylene, and maintained at that pressure by means of a pressure regulator on the ethylene supply. The ethylene feed is measured by a thermal flowmeter connected to a data acquisition computer. Temperature is maintained within 3° C. of the target temperature by adjusting cooling water flow through the cooling coil. At the end of the desired polymerization batch time, ethylene flow is stopped, and the reactor is vented to atmospheric pressure. The reactor is then disassembled, and the product collected on a paper filter and washed with about 100 cc of methanol. The washed polyethylene product is dried on the filter, followed by drying to constant weight in a vacuum oven at 80° C. Results for particle size and efficiency of polyolefin production are given, along with PFA information, in several of the preceding tables of this experimental section.

We claim:

1. A method of making a precision fragmentation assemblage, comprising the steps of:
   (A) polymerizing a first monomer in aqueous medium to form plural fragmentation domains dispersed in said aqueous medium, said fragmentation domains comprising a first polymer;
   (B) combining a second monomer with said fragmentation domains in said aqueous medium;
   (C) optionally, combining a porogen with said fragmentation domains in said aqueous medium;

(D) optionally, combining plural polymeric nanoparticles with said fragmentation domains in said aqueous medium;
(E) agglomerating said plural fragmentation domains to form one or more agglomerate particles comprising said fragmentation domains, said second monomer, optionally said porogen, and optionally said polymeric nanoparticles; and
(F) polymerizing said second monomer to form a second polymer,
wherein said second monomer comprises at least one multi-ethylenically unsaturated monomer in an amount of at least 0.05 percent by weight to 100 percent by weight, based on the weight of said second monomer;
wherein said precision fragmentation assemblage comprises:
(i) a plurality of fragmentation domains;
(ii) one or more fragmentation zones;
wherein said fragmentation domain comprises said first polymer; and
wherein said fragmentation zone comprises:
(a) a connecting phase;
(b) optionally, one or more pore phases; and
(c) optionally, plural polymeric nanoparticles;
wherein:
said connecting phase comprises said second polymer;
said second polymer comprises at least one multi-ethylenically unsaturated monomer, present as polymerized units, in an amount of at least 0.05 percent by weight to 100 percent by weight, based on the weight of said second polymer;
said polymeric nanoparticles comprise a third polymer comprising, as polymerized units, a third monomer; and
(iii) one or more tether groups covalently bound to a polymeric chain, wherein said polymeric chain is a chain selected from the group consisting of said first polymer, said second polymer, said third polymer, and combinations thereof; and
wherein at least one monomer selected from said first monomer, said second monomer, and said third monomer is a monomer having a tether group,
wherein said tether group comprises a functional group selected from the group consisting of epoxy, vinyl, allyl, imino, imide, aziridinyl, hydrazide, amidino, hydroperoxy, formyl, methoxycarbonyl, carbamoyl, sulfone, sulfine, sulfeno, thiol, thiocarboxyl, thioformyl, pyrrolyl, piperidyl, indazolyl, carbazolyl, and combinations thereof.

2. The method according to claim 1, comprising the further steps of:
isolating said precision fragmentation assemblage; and
drying, or allowing to dry, said precision fragmentation assemblage.

3. The method according to claim 1, wherein said agglomerate particles are present in said aqueous medium as an aqueous dispersion or aqueous slurry.

4. The method according to claim 1, wherein said one or more agglomerate particles are present as a monolith having a monolithic structure.

5. The method according to claim 1, wherein said first monomer comprises a multi-ethylenically unsaturated monomer in an amount of at least 0.5 weight percent to 100 weight percent, based on the weight of said first monomer.

6. The method according to claim 1, wherein said first monomer comprises a multi-ethylenically unsaturated monomer in an amount of at least 2 weight percent to 100 weight percent, based on the weight of said first monomer.

7. The method according to claim 1, wherein said first monomer comprises a multi-ethylenically unsaturated monomer in an amount of at least 10 weight percent to 100 weight percent, based on the weight of said first monomer.

8. The method according to claim 1, comprising the further step of combining an active ingredient with said fragmentation domains in said aqueous medium, wherein:
said active ingredient is selected from pharmaceuticals, biocides, herbicides, mildewcides, insecticides, fungicides, fertilizers, cosmetics, fragrances, liquid crystals, colorants, enzymes, or combinations thereof; and
said precision fragmentation assemblage further comprises said active ingredient.

9. The method according to claim 2, comprising the further step of combining an active ingredient with said precision fragmentation assemblage, wherein said active ingredient is selected from pharmaceuticals, biocides, herbicides, mildewcides, insecticides, fungicides, fertilizers, cosmetics, fragrances, liquid crystals, colorants, enzymes, or combinations thereof.

10. The method according to claim 1, comprising the further step of combining a catalytic component with said fragmentation domains in said aqueous medium, and wherein said precision fragmentation assemblage further comprises said catalytic component.

11. The method according to claim 2, comprising the further step of combining a catalytic component with said precision fragmentation assemblage.

12. The method according to claim 10, comprising the further step of combining an activator component with said fragmentation domains in said aqueous medium.

13. The method according to claim 11, comprising the further step of combining an activator component with said precision fragmentation assemblage.

14. The method according to claim 1, wherein said step of agglomerating is selected from coagulating, jetting, spray drying, or combinations thereof.

15. The method according to claim 1, wherein:
plural said fragmentation domains have an average particle diameter of 0.002 micron to 20 microns;
plural said polymeric nanoparticles have an average particle diameter of 0.002 micron to 0.1 micron; and
plural said precision fragmentation assemblages have an average particle diameter of 1 to 1,000 microns.

16. The method according to claim 1, comprising the further step of coagulating additional said plural fragmentation domains onto said agglomerate particles, and wherein:
said precision fragmentation assemblage has a structure wherein a core of said fragmentation domains is surrounded by one or more layers of said additional said plural fragmentation domains; and
said additional said plural fragmentation domains in any one of said layers are:
the same as or different than said fragmentation domains of said core; and
the same as or different than said additional said fragmentation domains of any other said layer.

17. The method according to claim 1, wherein said fragmentation domain has a shape selected from spherical, elliptical, or hemispherical.

18. The method according to claim 1, wherein:
said fragmentation domain has multiple phases;
at least one said phase comprises said first polymer; and
at least one said phase comprises a non-polymer wherein said non-polymer is present in a solid, liquid, gaseous, or super-critical state.

19. The method according to claim 18, wherein said fragmentation domain has a core and a shell wherein:
said shell comprises said first polymer;
said core comprises said non-polymer; and
said fragmentation domain has a morphology comprising a shell selected from: a continuous and unbroken shell, a shell having a single hole, and a shell having multiple holes.

* * * * *